US008750712B2

(12) United States Patent
Ruiz et al.

(10) Patent No.: US 8,750,712 B2
(45) Date of Patent: Jun. 10, 2014

(54) CROSS-TALK REDUCTION IN A BIDIRECTIONAL OPTOELECTRONIC DEVICE

(75) Inventors: Araceli Ruiz, West Covina, CA (US); Peter C. Sercel, Pasadena, CA (US); Joel S. Paslaski, San Gabriel, CA (US); Rolf A. Wyss, Glendale, CA (US)

(73) Assignee: HOYA Corporation USA, Santa Clara, CA (US)

( * ) Notice: Subject to any disclaimer, the term of this patent is extended or adjusted under 35 U.S.C. 154(b) by 0 days.

(21) Appl. No.: 13/225,723

(22) Filed: Sep. 6, 2011

(65) Prior Publication Data

US 2012/0057880 A1 Mar. 8, 2012

Related U.S. Application Data

(60) Provisional application No. 61/380,310, filed on Sep. 6, 2010.

(30) Foreign Application Priority Data

Apr. 28, 2011 (WO) ............... PCT/US2011/034356
Jun. 25, 2011 (WO) ............... PCT/US2011/041919

(51) Int. Cl.
*H04B 10/40* (2013.01)
(52) U.S. Cl.
USPC ........................................ 398/135
(58) Field of Classification Search
USPC ........................................ 398/135
See application file for complete search history.

(56) References Cited

U.S. PATENT DOCUMENTS

| | | | |
|---|---|---|---|
| 5,677,779 A | 10/1997 | Oda et al. | |
| 6,255,738 B1 * | 7/2001 | Distefano et al. | 257/788 |
| 6,437,891 B1 | 8/2002 | Chandrasekhar et al. | |
| 6,480,639 B2 * | 11/2002 | Hashimoto et al. | 385/14 |
| 7,093,988 B2 | 8/2006 | Tsumori | |
| 7,606,499 B2 | 10/2009 | Pan et al. | |
| 8,025,444 B2 * | 9/2011 | Choi et al. | 385/88 |
| 2001/0009469 A1 | 7/2001 | Shimizu et al. | |
| 2002/0102044 A1 | 8/2002 | Barnard et al. | |
| 2004/0213516 A1 | 10/2004 | Gordon | |
| 2005/0078916 A1 | 4/2005 | Hosking | |
| 2005/0100345 A1 | 5/2005 | Welch et al. | |
| 2005/0117904 A1 | 6/2005 | Choi et al. | |
| 2007/0086708 A1 * | 4/2007 | Nojima et al. | 385/88 |
| 2007/0090542 A1 * | 4/2007 | Condie et al. | 257/787 |
| 2007/0131955 A1 | 6/2007 | Park et al. | |
| 2009/0015456 A1 * | 1/2009 | Moore | 342/4 |
| 2010/0003506 A1 | 1/2010 | Desai et al. | |
| 2010/0135619 A1 * | 6/2010 | Choi et al. | 385/88 |
| 2011/0121181 A1 * | 5/2011 | Costello et al. | 250/338.1 |
| 2011/0217045 A1 | 9/2011 | Watson et al. | |
| 2001/0268450 | 11/2011 | Paslaski et al. | |
| 2011/0318016 A1 | 12/2011 | Wyss et al. | |

OTHER PUBLICATIONS

International Search Report & Written Opinion dated Dec. 22, 2011 in co-owned App No. PCT/US2011/034356.
International Search Report & Written Opinion dated Jan. 10, 2012 in co-owned App No. PCT/US2011/041919.
International Search Report & Written Opinion dated Mar. 14, 2012 in counterpart App No. PCT/US2011/050485.

* cited by examiner

*Primary Examiner* — Shi K Li
(74) *Attorney, Agent, or Firm* — David S. Alavi

(57) ABSTRACT

A multi-channel or bidirectional optoelectronic device comprises a two or more optoelectronic components, e.g., a photodetector and a light source. A protective encapsulant can be applied to the optoelectronic device that includes hollow dielectric microspheres to reduce electrical cross-talk, and that can further include an optical absorber to reduce optical cross-talk.

18 Claims, 19 Drawing Sheets

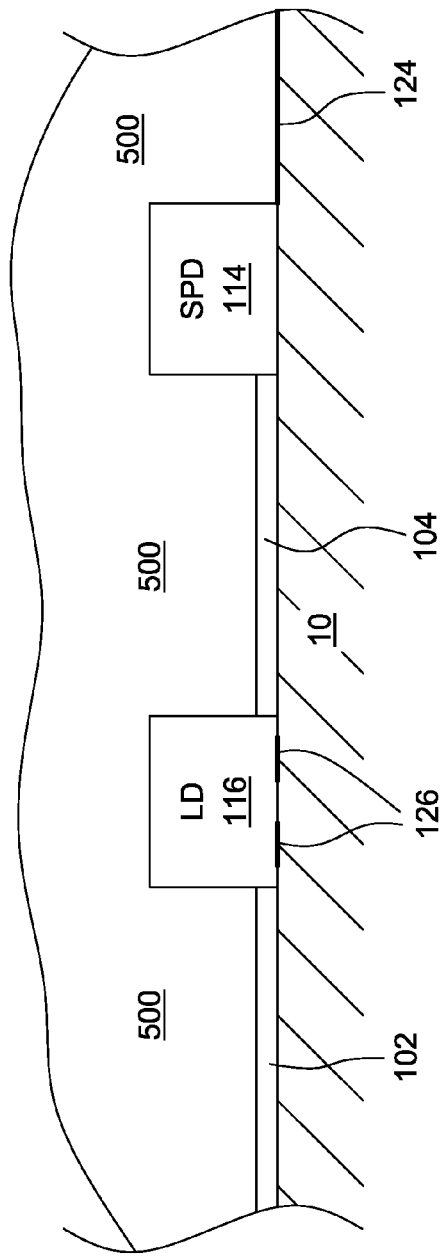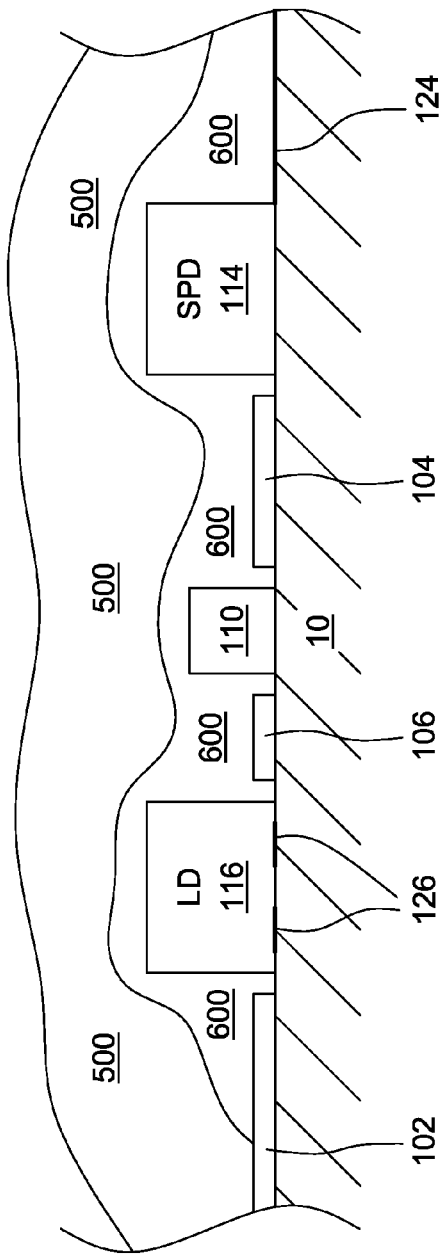

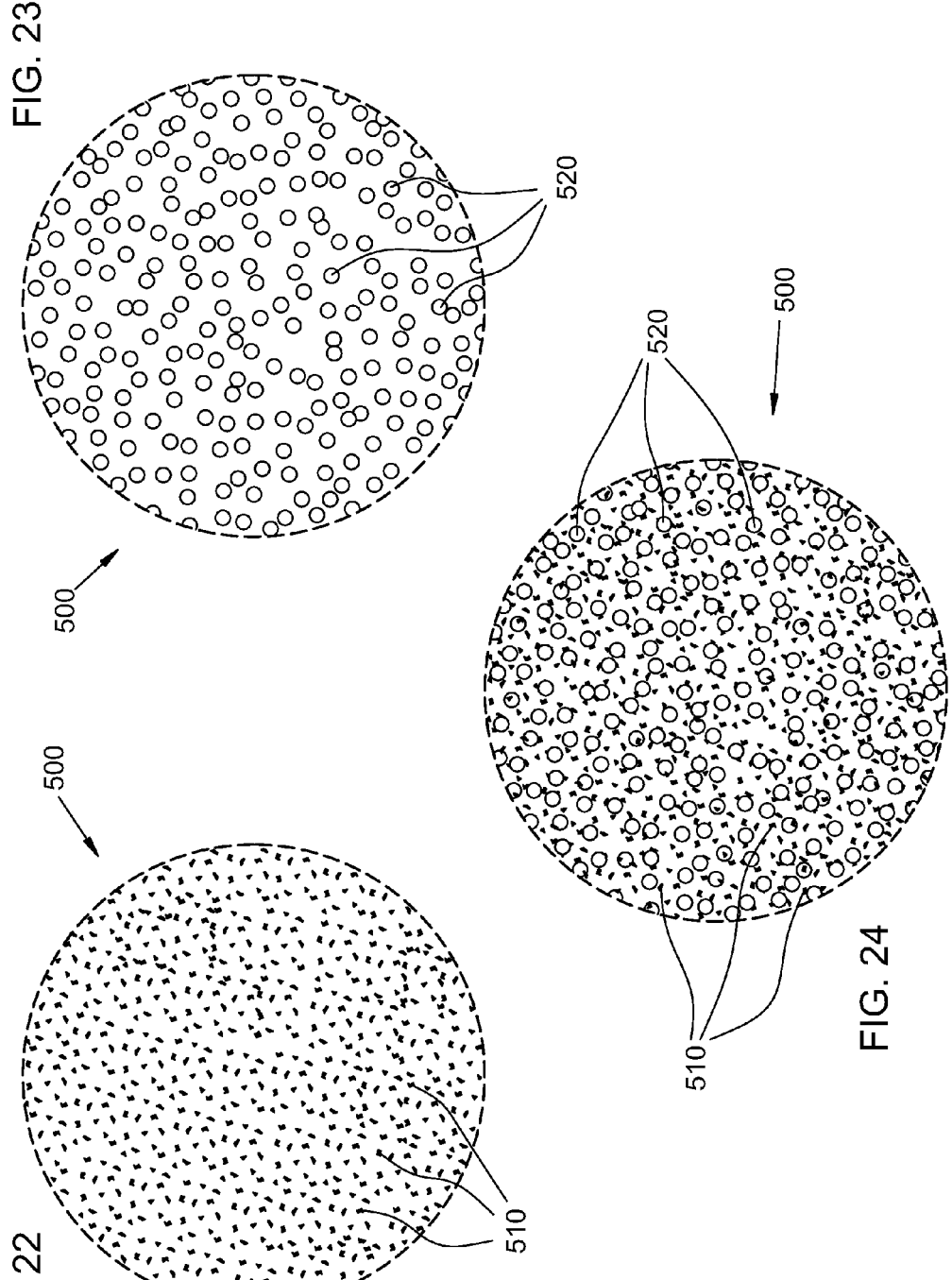

CROSS-TALK REDUCTION IN A BIDIRECTIONAL OPTOELECTRONIC DEVICE

BENEFIT CLAIMS TO RELATED APPLICATIONS

This application claims benefit of (i) co-pending U.S. provisional App. No. 61/380,310 filed Sep. 6, 2010 in the names of Peter C. Sercel, Araceli Ruiz, and Joel S. Paslaski, (ii) co-pending international App. No. PCT/US2011/034356 filed Apr. 28, 2011 in the names of Joel S. Paslaski, Araceli Ruiz, Peter C. Sercel, and Rolf A. Wyss, and (iii) co-pending international App. No. PCT/US2011/041919 filed Jun. 25, 2011 in the names of Rolf A. Wyss, Joel S. Paslaski, Araceli Ruiz, and Peter C. Sercel, each of said provisional and international applications being incorporated by reference as if fully set forth herein.

BACKGROUND

The field of the present invention relates to bidirectional or multi-channel optoelectronic devices, including bidirectional optoelectronic transceivers. In particular, (i) a light source drive circuit, (ii) multi-function encapsulation, and (iii) a light-trapping structure formed on a waveguide substrate are disclosed herein for reducing cross-talk in a bidirectional optoelectronic device.

A bidirectional optoelectronic transceiver is a device that can simultaneously (i) receive one or more input optical signals and generate corresponding output electrical signals and (ii) receive one or more input electrical signals and generate corresponding output optical signals. More generally, a multi-channel optoelectronic device is one that can simultaneously handle such conversion between electrical and optical signals for two or more such pairs of corresponding signals (each pair comprising a "channel"). Such multi-channel devices can be "unidirectional" (i.e., wherein all input signals are optical and all corresponding output signals are electrical, or vice versa) or "bidirectional" (already described above).

In general, the input and output signals (optical and electrical) can be transmitted and received in any suitable way, including, e.g., free-space propagation (optical or electrical), electrical conduction by conductive wire, cable, or trace (electrical), or propagation as a guided mode in an optical fiber or waveguide (optical). It is common in telecommunications devices for the optical signals (input and output) to be received from or transmitted into an optical fiber or waveguide, and for the electrical signals to be received from or transmitted to a conductive wire, cable, or trace.

In this context, each signal (electrical or optical) typically comprises a carrier wave modulated according to a given scheme to encode digital or analog information (e.g., a digital data stream, an analog or digital video signal, or an analog or digital audio signal). The correspondence referred to above (i) between the input optical signal and the output electrical signal, and (ii) between the input electrical signal and the output optical signal, is a correspondence of the information encoded according to their respective modulation schemes. Many modulation schemes exist for encoding information onto an electrical or optical carrier signal. One common example of an electrical modulation scheme includes baseband digital amplitude modulation; another common example includes amplitude modulation of a radio frequency (RF) electrical carrier wave. One common example of an optical modulation scheme includes amplitude modulation of a visible or near-infrared optical carrier wave. Multiple electrical or optical modulation schemes can in some instances be used together or overlaid on one another. In some examples, by using differing carrier frequencies for input and output signals (electrical or optical), both input and output signals can be carried by a common transmission medium (e.g., input and output optical signals carried by a common optical fiber or waveguide, or input and output electrical signals carried by a common conductive wire, cable, or trace). In other examples, input and output electrical signals can be carried by separate conductive wires or traces, or input and output optical signals can be carried by separate optical fibers or waveguides.

Typically, care must be taken to limit the effects of cross-talk in a multi-channel or bidirectional optoelectronic device. Electrical cross-talk refers to an electrical signal (input or output) adversely affecting reception or generation of another electrical signal, and optical cross-talk refers to an optical signal (input or output) interfering with reception or generation of another optical signal. In principle, a cross-talk problem can arise in either or both directions (i.e., input affecting output, output affecting input, or both), and limiting cross-talk in both directions can be advantageous. In practice, in a bidirectional device, an input electrical signal (that drives the light source to generate the output optical signal) typically is larger in absolute magnitude than an output electrical signal (generated by photodetection of a typically weak input optical signal). As a result, the input electrical signal typically affects the output electrical signal (or its generation from the input optical signal) to a greater degree than the output electrical signal affects the input electrical signal (or generation of the output optical signal therefrom). Similarly, in a bidirectional device, the output optical signal typically is larger in absolute magnitude than the input optical signal. As a result, the output optical signal typically affects the input optical signal (or generation of the output electrical signal therefrom) to a greater degree than the input optical signal affects the output optical signal (or its generation from the input electrical signal).

Cross-talk in a multi-channel or bidirectional optoelectronic device can manifest itself in a variety of ways. In one example, electrical cross-talk can result in decreased sensitivity, in the presence of an input electrical signal, for reception of an input optical signal and generation of a corresponding output electrical signal by the photodetector. In another example, optical cross-talk can result in decreased sensitivity, in the presence of an output optical signal, for reception of an input optical signal and generation of a corresponding output electrical signal by the photodetector. In those examples and in others, such decreased sensitivity can manifest itself, e.g., as decreased signal-to-noise ratio, increased bit error rate for a digital signal, or increased noise floor. Sensitivity is simply the minimum optical power needed to ensure sufficiently faithful encoding on the output electrical signal of information encoded on the input optical signal (e.g., to guarantee a bit error rate below a specified limit for a digital data signal; various suitable criteria can be established for various types of signals). The sensitivity of the photodetector is typically degraded in the presence of an input electrical signal applied to the light source or the resulting output optical signal, relative to its sensitivity in the absence of an input electrical signal or output optical signal. Such degradation can be referred to or quantified generically as a "cross-talk penalty," expressed as a ratio of the sensitivity of the photodetector with versus without the input electrical signal applied to the light source (or expressed as a difference between sensitivities given as dBm, for example). Reduction of optical or electrical cross-talk is a way to improve the photodetection performance of the bidirectional optoelectronic device, and can in some instances be imperative for meeting photodetection performance requirements of the device. Analogously, a cross-talk penalty can be quantified for faithful encoding on the output optical signal of information encoded on the input electrical signal in the presence of an input optical signal or an output electrical signal.

SUMMARY

A multi-channel optoelectronic device comprises two or more optoelectronic components, and a protective encapsulant arranged to encapsulate the optoelectronic components; each optoelectronic component comprises a photodetector or a light source. Each photodetector is arranged (i) to receive a corresponding input optical signal modulated to encode corresponding transmitted information and (ii) to generate in response to the corresponding input optical signal a corresponding output electrical signal modulated to encode the corresponding transmitted information. Each light source is arranged (i) to receive a corresponding input electrical signal modulated to encode corresponding transmitted information and (ii) to generate in response to the corresponding input electrical signal a corresponding output optical signal modulated to encode the corresponding transmitted information.

The encapsulant includes hollow dielectric microspheres dispersed within its volume so as to reduce a cross-talk penalty arising from unwanted electrical signals present in the encapsulant to a level below that exhibited by the multi-channel device without the microspheres in the encapsulant. The encapsulant can further include an optical absorber dispersed within its volume so as to reduce a cross-talk penalty arising from unwanted optical signals present in the encapsulant to a level below that exhibited by the optoelectronic device without the optical absorber in the encapsulant.

The multi-channel optoelectronic device can comprise a bidirectional optoelectronic device, wherein at least one optoelectronic component is a photodetector and at least one optoelectronic component is a light source. The bidirectional optoelectronic device can be arranged (i) so that sensitivity of the photodetector, with the input electrical signal applied to the light source, is within about 3 dBm of the sensitivity of the photodetector with no input electrical signal applied to the light source or (ii) so that the photodetector exhibits a cross-talk penalty less than about 3 dBm. The bidirectional optoelectronic device can be further arranged with the light source and photodetector on the waveguide substrate within less than about 2 mm of one another, or on a substrate having edge dimensions less than about 10 mm.

Objects and advantages pertaining to multi-channel or bidirectional optoelectronic devices may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 21 illustrates schematically a protective encapsulant on another exemplary bidirectional optoelectronic device.

FIG. 22 illustrates schematically particles of an optical absorber dispersed in an encapsulant.

FIG. 23 illustrates schematically hollow dielectric microspheres dispersed in an encapsulant.

FIG. 24 illustrates schematically particles of an optical absorber and hollow dielectric microspheres dispersed in an encapsulant.

FIG. 25 illustrates schematically an optical encapsulant and a protective encapsulant on another exemplary bidirectional optoelectronic device.

It should be noted that the embodiments depicted in this disclosure are shown only schematically, and that not all features may be shown in full detail or in proper proportion. Certain features or structures may be exaggerated relative to others for clarity. The Drawings should not be regarded as being to scale. It should be noted further that the embodiments shown are exemplary only, and should not be construed as limiting the scope of the written description or appended claims.

DETAILED DESCRIPTION OF EMBODIMENTS

Electrical cross-talk in a multi-channel or bidirectional optoelectronic device can arise through any number or mechanisms or pathways involving a photodetector, a light source, a drive circuit for the light source, or an amplification or filtering circuit for the photodetector. Such electrical cross-talk is often attributed to capacitive or inductive coupling between or among those elements. Optical cross-talk in a multi-channel or bidirectional optoelectronic device can arise through any number of mechanisms or pathways involving the photodetector, the light source, waveguides, filters, optical splitters or combiners, optical taps, or other optical elements. Such optical cross-talk is often attributed to unwanted scattering, reflection, or transmission of light between or among those elements. As the size of the multi-channel or bidirectional optoelectronic is reduced, electrical or optical cross-talk can typically become more severe. Regardless of the particular mechanism or combination of mechanisms that give rise to the cross-talk (optical or electrical), it would be desirable to reduce the cross-talk by suitable arrangements or adaptations of the multi-channel or bidirectional optoelectronic device.

Figure 1:
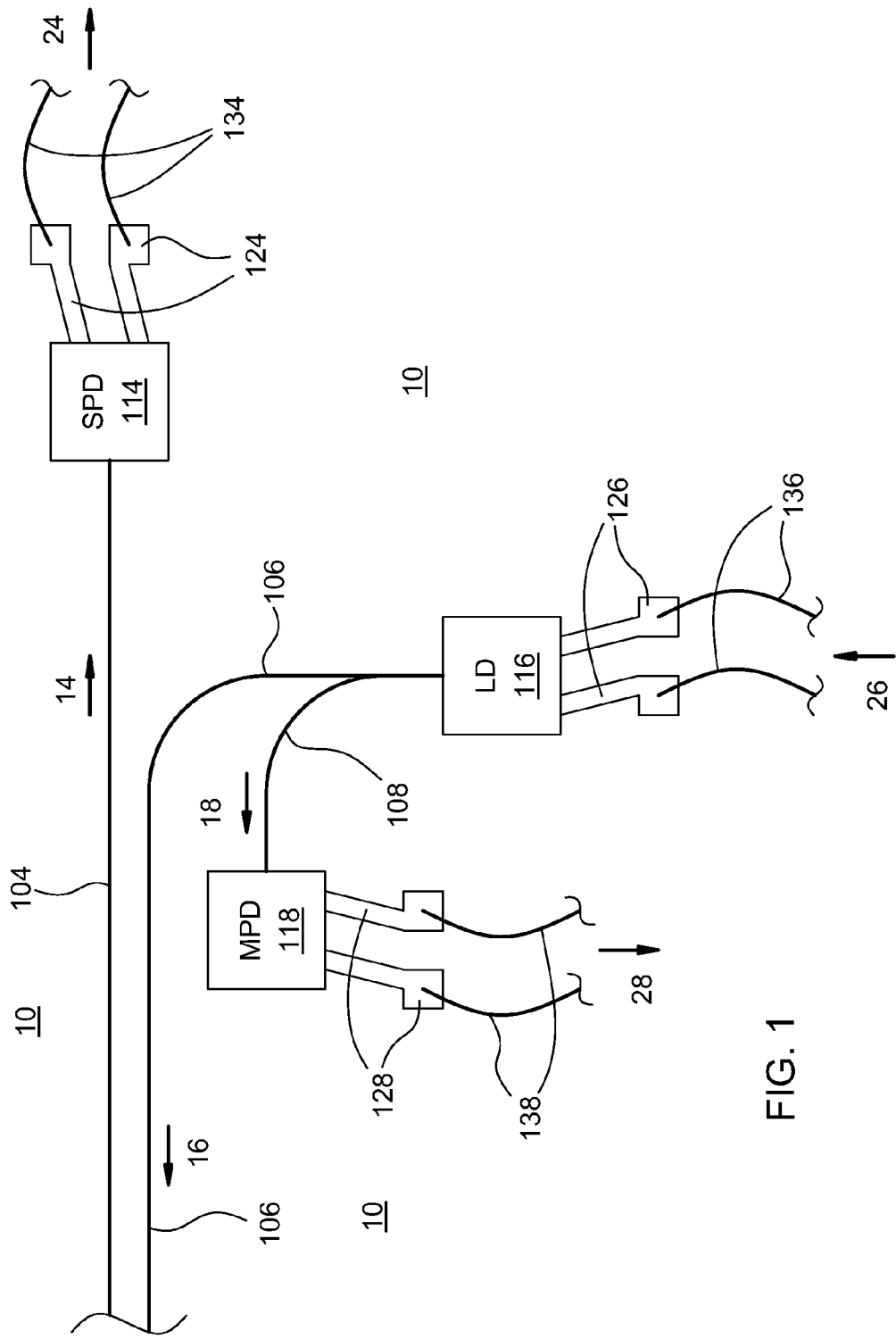
FIG. 1 illustrates schematically electrical and optical signals in an exemplary bidirectional optoelectronic device.
Figure 2:
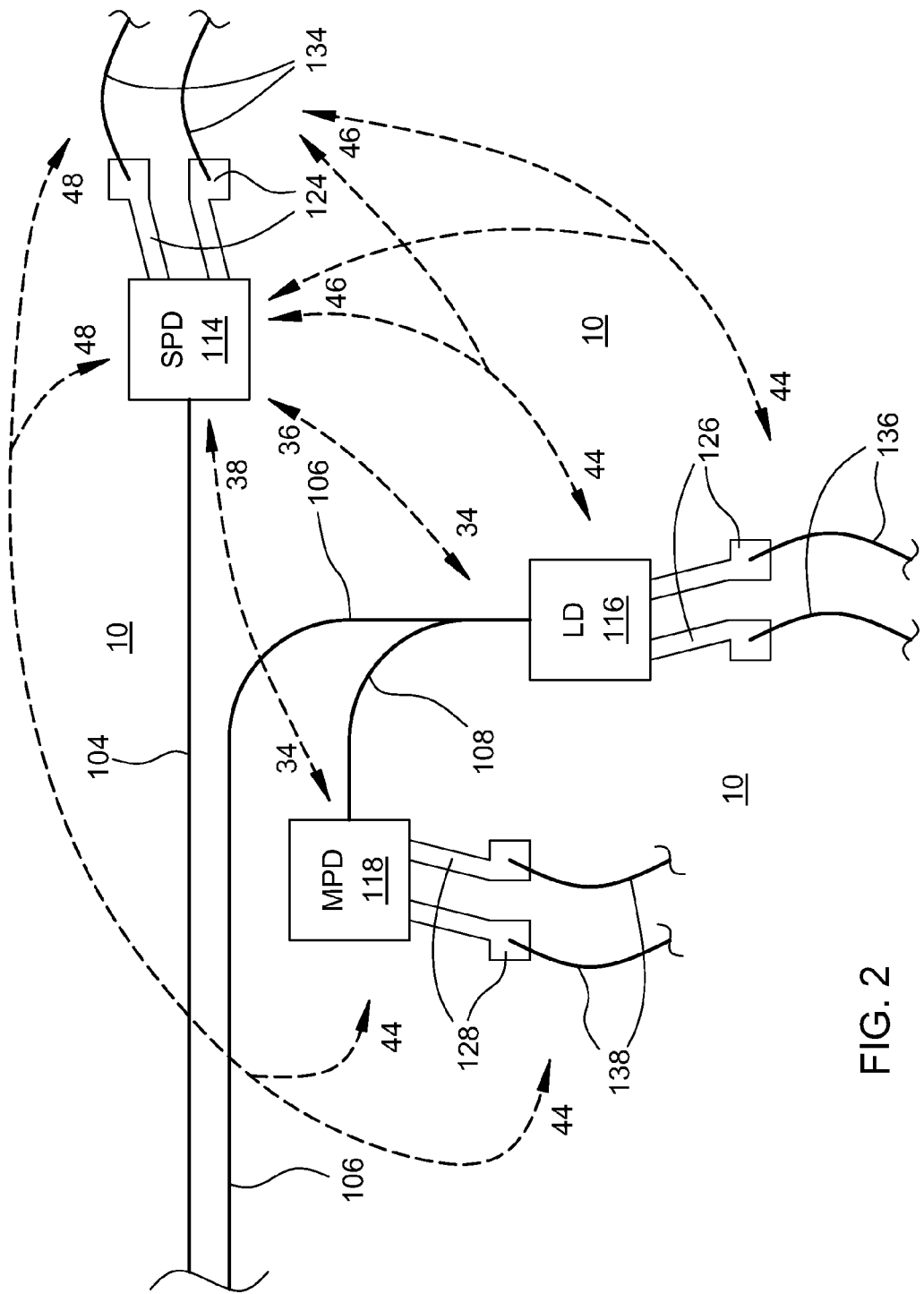
FIG. 2 illustrates schematically unwanted electrical and optical signals in the exemplary bidirectional optoelectronic device of FIG. 1.

An example of a bidirectional optoelectronic device is illustrated schematically in FIGS. 1 and 2, and comprises a signal photodetector 114 (typically, but not necessarily, a photodiode) and a light source 116 (typically, but not necessarily, a laser diode). The exemplary device also includes a monitor photodetector 118, but devices that do not include such a monitor photodetector shall fall within the scope of the present disclosure or appended claims. FIG. 1 illustrates desired electrical and optical signals, and FIG. 2 illustrates unwanted electrical and optical signals that can result in cross-talk. In FIG. 1, an input optical signal 14 propagates along an optical waveguide 104 and is received by the signal photodetector 114. The signal photodetector 114 generates an output electrical signal 24 from the input optical signal 14, and the output electrical signal 24 is transmitted from the signal photodetector 114 by conductive traces 124 and conductive wire leads 134. Any suitable optical or electrical elements can be employed for transmitting input optical signal 14 or output electrical signal 24. An input electrical signal 26 is transmitted to light source 116 by conductive wire leads 136 and conductive traces 126. Light source 116 generates an output optical signal 16 from the input electrical signal 26 that propagates along optical waveguide 106. Any suitable optical or electrical elements can be employed for transmitting input electrical signal 26 or output optical signal 16. In devices with a monitor photodetector 118, a portion of the output optical signal 16 is split off to form a monitor optical signal 18 (that propagates along optical waveguide 108 in the example of FIGS. 1 and 2; other suitable optical element(s) can be employed; suitable optical arrangements for splitting off the monitor optical signal 18 are described below). The monitor optical signal is received by the monitor photodetector 118, which in turn generates a monitor electrical signal 28 that is transmitted by conductive traces 128 and conductive wire leads 138 (in the example of FIGS. 1 and 2; other suitable conductive elements can be employed). The monitor electrical signal 28 typically serves as an input to a light source control circuit (not shown) that generates, modifies, conditions, or otherwise controls electrical input signal 26. Typically, the monitor electrical signal 28 is coupled to such a control circuit in a suitable feedback arrangement for maintaining a desired output level for output optical signal 16. The photodetector(s), light source(s), waveguides, and traces are typically positioned on a substrate 10. The conductive wire leads can be employed to make electrical connections to additional circuit elements not on the substrate 10. In some examples, such additional circuit elements can be positioned on a circuit board along with substrate 10. Many other arrangements can be employed.

In FIG. 2, an unwanted input electrical signal 46 (i.e., a portion of the input electrical signal 26 that does not reach light source 116 but instead arrives at a different, unwanted location; the term "unwanted" shall refer to any portion of an electrical or optical signal that similarly does not reach its intended destination, but arrives instead at a different, unwanted location) is shown propagating from light source 116 or conductive traces/wires 126/136 to the signal photodetector 114 or conductive traces/wires 124/134. Unwanted monitor electrical signal 48 is shown similarly propagating from monitor photodetector 118 (if present) or traces/wires 128/138 to signal photodetector 114 or traces/wires 124/134. Either or both of those unwanted signals 46 or 48 can distort the output electrical signal 24, by interfering with its generation by the signal photodetector 114 or with its transmission by traces/wires 124/134. Unwanted output electrical signals 44 are also shown propagating from signal photodetector 114 or traces/wires 124/134 to light source 116, traces/wires 126/136, monitor photodetector 118, or traces/wires 128/138. Those unwanted signals 44 can interfere with the transmission of input or monitor electrical signals 26/28 by the corresponding traces/wires, with generation of monitor electrical signal 28 by monitor photodetector 118, or with reception of input electrical signal 26 by light source 116. Because the signal photodetector 114, light source 116, monitor photodetector 118, and corresponding traces/wires are not intended to be directly connected to one another electrically, the propagation described above is typically radiative in nature and arises due to various capacitive or inductive electrical couplings between or among the signal photodetector 114, light source 116, monitor photodetector 118, the corresponding traces/wires, a drive circuit for the light source 116, or an amplification or filtering circuit for the photodetector 114. Propagation of unwanted electrical signals 44/46/48 therefore can occur above, below, and through substrate 10. FIG. 2 is exemplary, and does not necessarily show every possible source of unwanted electrical signals or every possible unwanted arrival location of such signals.

Also in FIG. 2, unwanted output optical signal 36 is shown propagating from light source 116 toward signal photodetector 114. Unwanted monitor optical signal 38 is shown similarly propagating from monitor photodetector 118 (if present) to signal photodetector 114. Either or both of those unwanted signals 36 or 38 can interfere with reception of input optical signal 14 by the signal photodetector 114 (e.g., by themselves being received by the signal photodetector 114 and acting as unwanted background noise). Unwanted input optical signals 34 are also shown propagating from signal photodetector 114 to light source 116 and monitor photodetector 118. Those unwanted signals 34 can interfere with generation of output optical signal 116 (e.g., by unwanted optical feedback into the light source 116) or with reception of monitor optical signal 18 by monitor photodetector 118. Because the optical waveguides 104 and 106 are separate (i.e., not intended to be optically coupled) in the example of FIGS. 1 and 2, the propagation described above typically is not in any guided optical mode, but arises from various scattering or reflective elements, structures, or media near the signal photodetector 114, the light source 116, or monitor photodetector 118, or from imperfect optical coupling between the waveguides 104, 106, or 108 and the signal photodetector 114, the light source 116, or monitor photodetector 118, respectively. Propagation of unwanted optical signals 34/36/38 therefore can occur above, below, or within substrate 10. FIG. 2 is exemplary, and does not necessarily show every possible source of unwanted optical signals or every possible unwanted arrival location of such signals.

Figure 3:
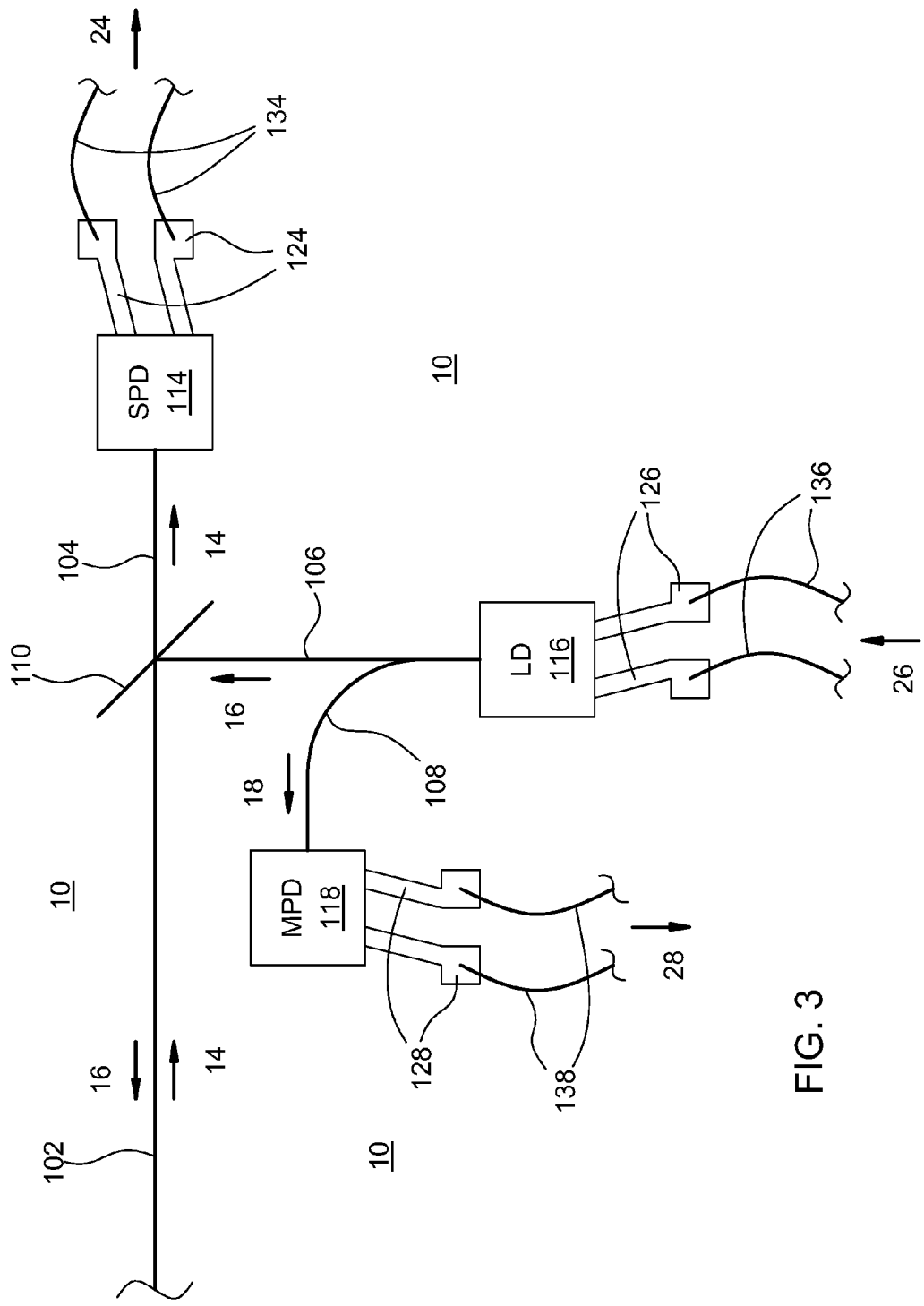
FIG. 3 illustrates schematically electrical and optical signals in another exemplary bidirectional optoelectronic device.
Figure 4:
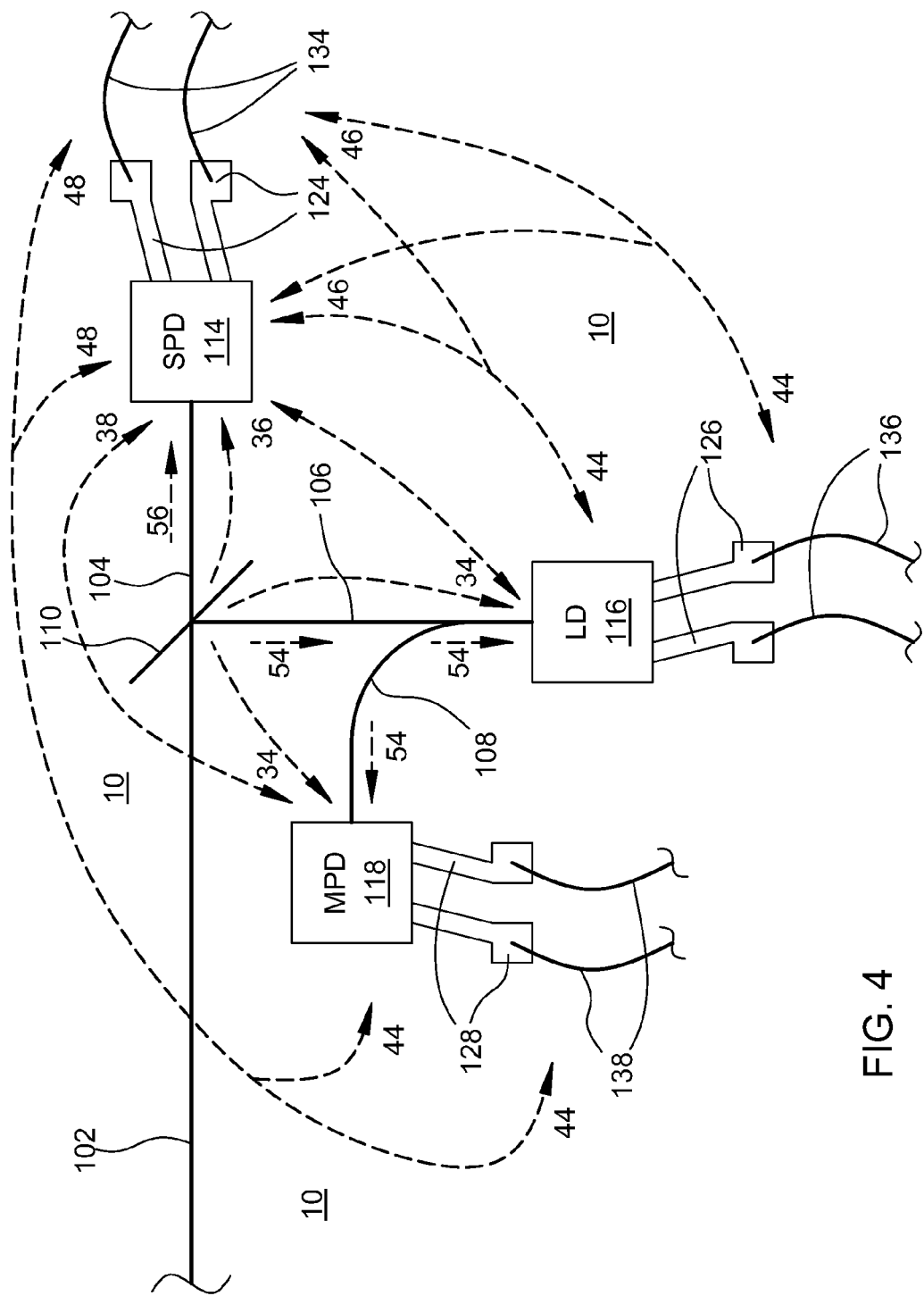
FIG. 4 illustrates schematically unwanted electrical and optical signals in the exemplary bidirectional optoelectronic device of FIG. 3.

Another example of a bidirectional optoelectronic device is shown in FIGS. 3 and 4, and is substantially similar to that of FIGS. 1 and 2, except that the input and output optical signals both propagate along a common optical waveguide 102. An optical splitter/combiner 110 directs input optical signal 14 from optical waveguide 102 to propagate along optical waveguide 104, and directs output optical signal 16 from optical waveguide 106 to propagate along optical waveguide 102 (in a direction opposite that of input optical signal 14).

The optical splitter/combiner 110 can comprise any element or combination of elements suitable for directing the input and output optical signals 14/16. Splitter/combiner 110 can comprise a beamsplitter for free-space optical beams positioned between end faces of optical waveguides 102, 104, and 106 (e.g., as disclosed in co-owned U.S. Pat. No. 7,031,575, U.S. Pat. No. 7,142,772, U.S. Pat. No. 7,366,379, U.S. Pat. No. 7,622,708, or U.S. Pub. No. 2010/0078547, each of which is hereby incorporated by reference), or can be implemented within joined waveguides 102, 104, and 106 that do not provide any interval of free-space propagation of the optical signals (e.g., as disclosed in co-owned U.S. Pat. No. 7,330,619, U.S. Pat. No. 7,813,604, or U.S. Pub. No. 2010/0272395, each of which is hereby incorporated by reference). Similar elements or arrangements can be employed to split off a portion of output optical signal 16 to form monitor optical signal 18. The splitter/combiner 110 can function on the basis of spectral separation of the optical signals (e.g., a dichroic beamsplitter or other filter, or a grating) or differential polarization of the optical signals, or on any other suitable basis for separating optical signals.

In FIG. 4, in additional to those unwanted signals already described for FIG. 2, several additional unwanted optical signals can result in cross-talk. Additional unwanted optical signals 34 and 36 can emanate from the optical splitter/combiner 110 as unguided signals, and can propagate toward the signal photodetector 114, light source 116, or monitor photodiode 118 (directly or as a result of scattering or reflection). In addition, because the optical waveguides 104 and 106 are both optically coupled to optical waveguide 102, unwanted optical signals can arise that propagate along the waveguides as supported optical modes. Unwanted input optical signal 54 can propagate along waveguide 106 to light source 116, or along optical waveguide 108 to monitor photodiode 118. Similarly, unwanted output optical signal 56 can propagate along waveguide 104 to signal photodetector 114.

FIGS. 2 and 4 are exemplary, in that they do not necessarily show every possible source of unwanted optical or electrical signals or every possible unwanted arrival location of such signals. In particular, no unwanted optical or electrical signals are shown propagating between the laser source 116 and the monitor photodetector 118. Such unwanted signals can and often do occur, but are typically less problematic (in terms of cross-talk) than unwanted optical signals 34/36/38 or unwanted electrical signals 44/46/48, because the light source 116 and the monitor photodetector 118 are intended to be coupled, optically via waveguide 108 and electrically through a light source control circuit (not shown). However, methods and apparatus disclosed below can be employed to mitigate the impact of any unwanted optical or electrical signals that might be present and give rise to cross-talk, not only those explicitly shown or described.

Figure 5:
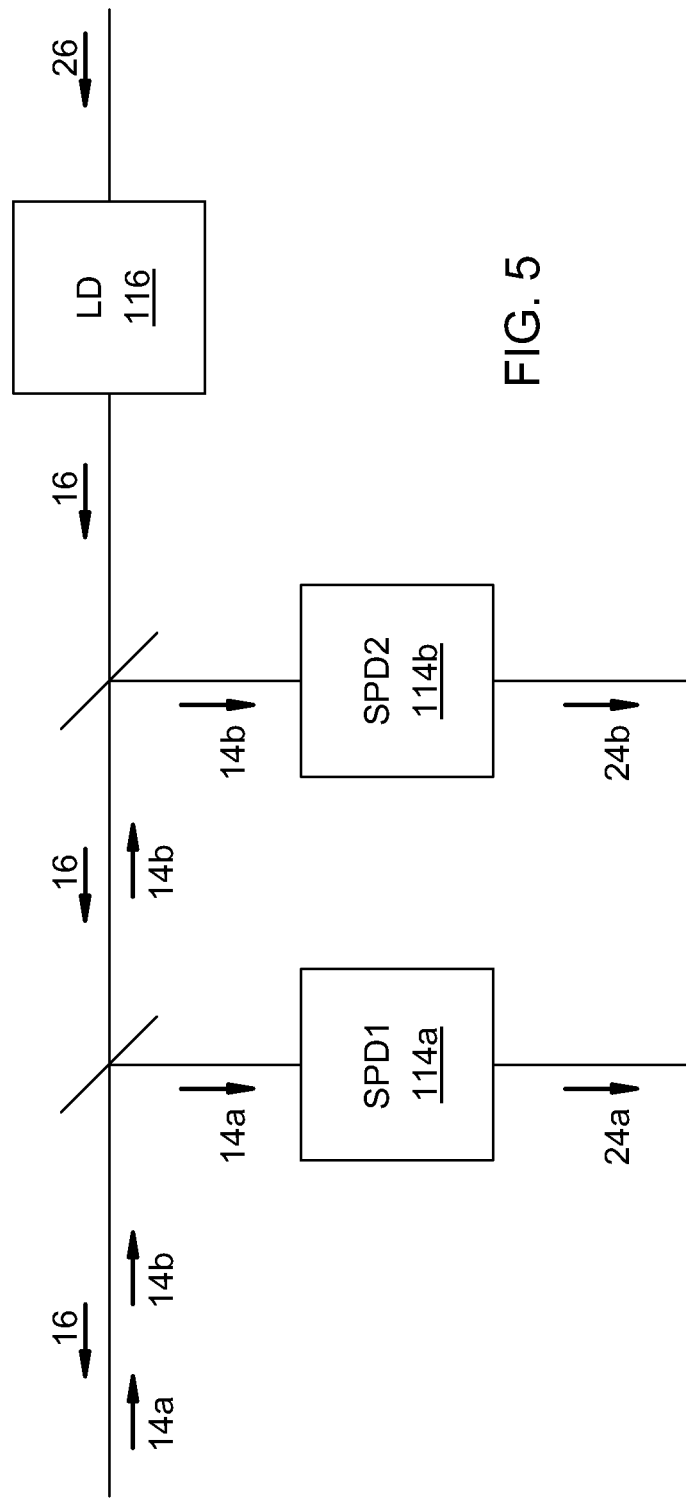
FIG. 5 illustrates schematically electrical and optical signals in another exemplary bidirectional optoelectronic device.

FIGS. 1 through 4 are also exemplary in that they only show a single light source 116 and a single signal photodetector 114, i.e., the exemplary bidirectional devices would function as so-called diplexers. More generally, a bidirectional optoelectronic device can include any desired number of light sources or signal photodetectors, and such devices shall fall within the scope of the present disclosure or appended claims. Unwanted optical or electrical signals can emanate from any of those multiple light sources or photodetectors, and result in cross-talk by arriving at any other of the light sources or photodetectors. For example, a so-called triplexer is illustrated schematically in FIG. 5 (with much detail and unwanted signals omitted for clarity) in which two independent input optical signals 14a/14b are received by corresponding signal photodetectors 114a/114b to generate corresponding output electrical signals 26a/26b. Still more generally, in a general multi-channel optoelectronic device, a cross-talk penalty can arise for any input or output signal (electrical or optical) due to an unwanted portion of any other input or output signal (electrical or optical).

Optical cross-talk and electrical cross-talk described above tend to become more pronounced as the overall size of the multi-channel or bidirectional device shrinks. In particular, in a multi-channel or bidirectional device wherein the photodetector(s), light source(s), waveguides, and traces are all positioned on a common substrate that is 10 mm or less in its edge dimensions, the cross-talk can become large enough to substantially degrade performance of the device. For example, in a bidirectional device assembled on a 5 mm substrate 10 (e.g., wherein the light source and the photodetector are within 2 or 3 mm of one another), an electrical cross-talk penalty larger than 3 dB has been observed, and an optical cross-talk penalty larger than 3 dB has been observed.

Regardless of the particular mechanism or combination of mechanisms that result in electrical or optical cross-talk, it would be desirable to reduce the electrical or optical cross-talk by suitable arrangements or adaptations of the bidirectional device.

Light Source Drive Circuit

The present disclosure is related to subject matter disclosed in (i) U.S. provisional App. No. 61/328,675 filed Apr. 28, 2010 in the name of Joel S. Paslaski and (ii) U.S. non-provisional App. No. 13/096,648 filed Apr. 28, 2011 in the names of Joel S. Paslaski, Araceli Ruiz, Peter C. Sercel, and Rolf A. Wyss. Both of said applications are incorporated by reference as if fully set forth herein.

Figure 6:
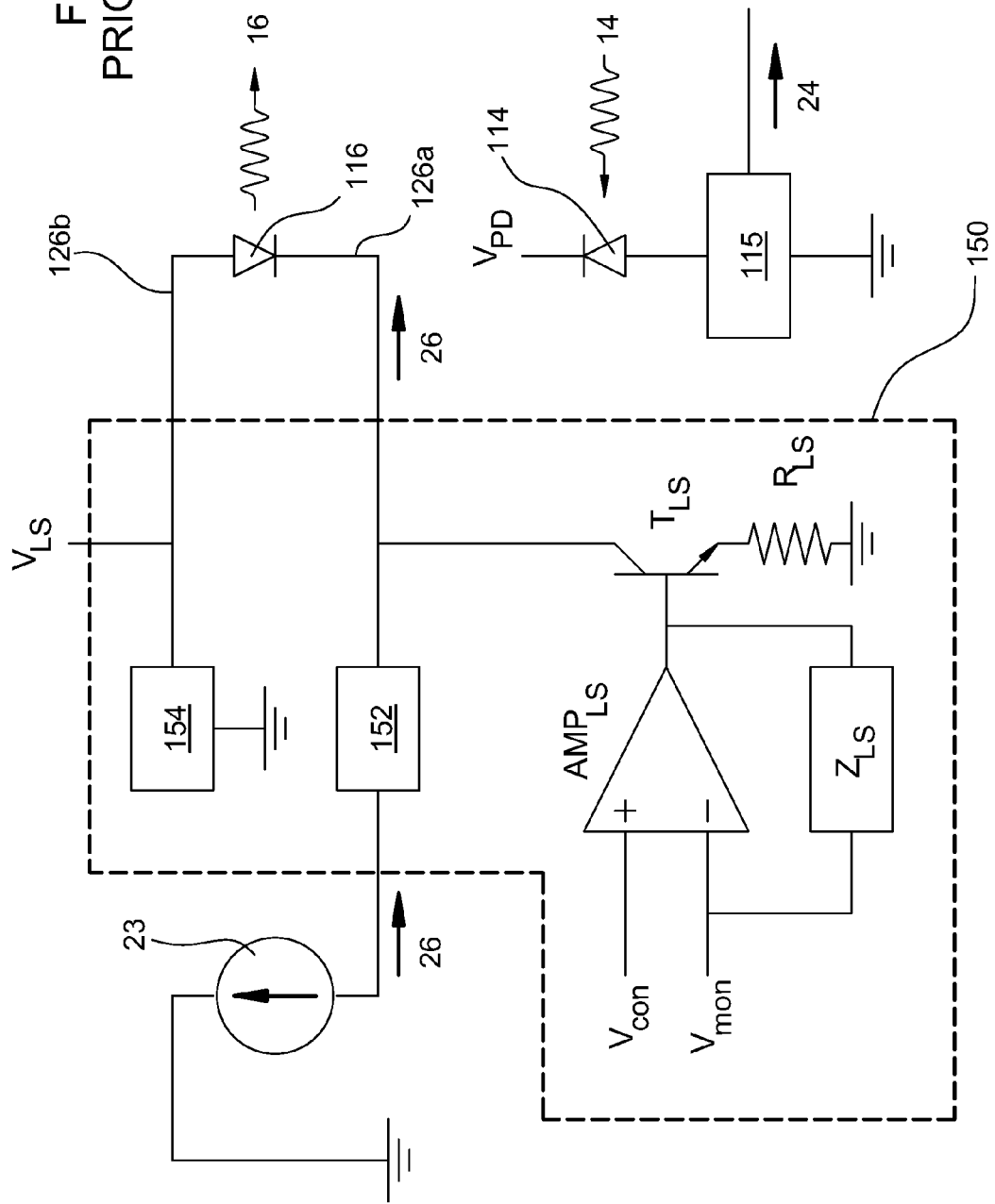
FIG. 6 illustrates schematically a conventional light source drive circuit for a bidirectional optoelectronic device.

A conventional bidirectional optoelectronic device is illustrated in the functional block diagram of FIG. 6 and comprises a photodetector 114, a light source 116, and a drive circuit 150 for the light source 116. The photodetector 114 is arranged to receive an input optical signal 14 modulated to encode first transmitted information and to generate in response an output electrical signal 24 modulated to encode the first transmitted information. The photodetector 114 can comprise a p-i-n photodiode, an avalanche photodiode, or any other suitable photodetector. A p-i-n photodiode 114 is shown in the example of FIG. 6, connected to circuit 115 and reverse-biased by voltage $V_{PD}$. The output electrical signal 24 is shown passing through circuit 115, which can comprise a single resistor in series with the photodiode 114, or can comprise any suitable filtering, impedance matching, amplification, or other active or passive circuitry (e.g., a transimpedance amplifier and associated components and voltage supply).

The light source 116 of the conventional bidirectional optoelectronic device is arranged to receive an input electrical signal 26 from a unipolar signal source 23 that is modulated to encode second transmitted information and to generate in response an output optical signal 16 modulated to encode the second transmitted information. The light source 116 has first and second electrical input leads 126a/126b, and in the example of FIG. 6 comprises a laser diode 116. The light source 116 receives the input electrical signal 26 applied by a drive circuit 150 at electrical input lead 126a, and is connected to an applied voltage $V_{LS}$ by drive circuit 150 at the electrical input lead 126b. The input electrical signal 26 may or may not include a DC offset, and can be AC coupled or DC coupled to the light source 116 via circuits 152 and 154. The circuits 152 and 154 can each comprise a simple connection or diode arranged for DC coupling the input electrical signal 26, a single capacitor arranged for AC coupling the input electrical signal 26, or can comprise any suitable filtering, impedance matching, amplification, or other active or passive circuitry for applying the input electrical signal 26 to the light source 116. An operational amplifier $AMP_S$, feedback impedance $Z_{LS}$, transistor $T_{LS}$, and resistor $R_{LS}$ are shown in the example of FIG. 6 and comprise a control circuit for regulating the average optical power emitted by the laser diode 116. Control and monitor voltages $\mathrm{I}_{con}$ and $V_{mon}$, respectively, are applied to operational amplifier $AMP_{LS}$ to regulate the average current flow through transistor $T_{LS}$ and hence through laser diode 116. The control and monitor voltages can be generated in any suitable way (e.g., by monitoring the average power of output optical signal 16, or by monitoring the average power of the input electrical signal 26). Many suitable arrangements are known and can be employed for regulating the average current flow through laser diode 116, or such regulation can be omitted altogether if desired (and is omitted from subsequent figures).

Figure 7:
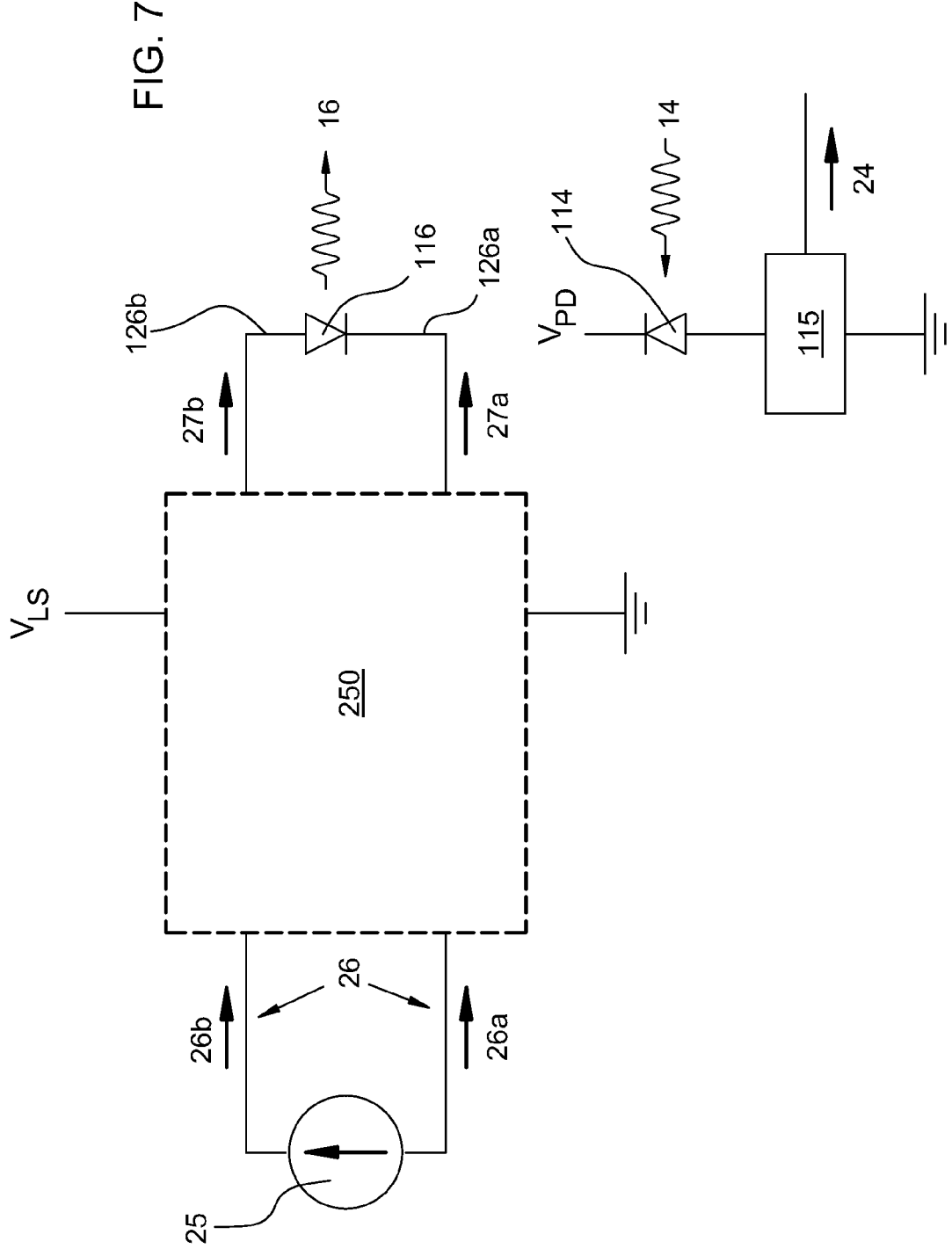
FIG. 7 illustrates schematically an exemplary light source drive circuit for a bidirectional optoelectronic device.

An exemplary bidirectional optoelectronic device according to the present disclosure is illustrated in the functional block diagram of FIG. 7 and comprises a photodetector 114, a light source 116, and a drive circuit 250 for the light source 116. The photodetector 114 is arranged (i) to receive an input optical signal 14 modulated to encode first transmitted information and (ii) to generate an output electrical signal 24 modulated to encode the first transmitted information. The output electrical signal 24 can comprise a baseband amplitude-modulated digital signal; other suitable modulation schemes or carrier frequencies can be employed. The photodetector 114 can comprise a p-i-n photodiode, an avalanche photodiode, or any other suitable photodetector. A p-i-n photodiode 114 is shown in the example of FIG. 7, connected to circuit 115 and reverse-biased by voltage $V_{PD}$. The output electrical signal 24 is shown passing through circuit 115, which can comprise a single resistor in series with the photodiode 114, or can comprise any suitable filtering, impedance matching, amplification, or other active or passive circuitry (e.g., a transimpedance amplifier and associated components and voltage supply).

The light source 116 of the bidirectional optoelectronic device is arranged (i) to receive an input electrical signal as inverted replica signals 26a/26b from a bipolar signal source 25 that is modulated to encode second transmitted information and (ii) to generate in response an output optical signal 16 modulated to encode the second transmitted information. The bipolar input electrical signals 26a/26b shall be referred to collectively as input electrical signal 26. The input electrical signal 26 can comprise a baseband amplitude-modulated digital signal; other suitable modulation schemes or carrier frequencies can be employed. The light source 116 has first and second electrical input leads 126a/126b, and in the example of FIG. 7 comprises a laser diode 116. The light source 116 receives the input electrical signal 26 as first and second portions 27a/27b applied by a drive circuit 250 at first and second electrical input leads 126a and 126b, respectively, and a supply voltage $V_{LS}$ is applied through drive circuit 250 at the second electrical input lead 126b. The input electrical signal 26 may or may not include a DC offset, and can be AC coupled or DC coupled to the light source 116 via drive circuit 250 (as first and second input electrical signal portions 27a/27b). The circuit 250 can comprise any of myriad arrangements contrived by those skilled in the electrical or electronic arts for receiving input electrical signal 26 and in response applying first and second portions 27a/27b to the electrical input leads 126a/126b, respectively, as described below, and the present disclosure and appended claims shall be construed as encompassing any circuit arrangement that operates as disclosed herein. Circuit 250 can include any suitable passive components, active components, voltage or current supplies, filtering circuitry, impedance matching circuitry, amplification circuitry, or other active or passive circuitry for receiving input electrical signal 26 and in response applying first and second portions 27a/27b to the electrical input leads 126a/126b. Drive circuit 250 can further include additional control or regulating circuitry for controlling the average current flowing through (and hence average optical output power from) light source 116 (as in FIG. 6), however, such circuitry is omitted from the drawings for clarity.

Figure 8:
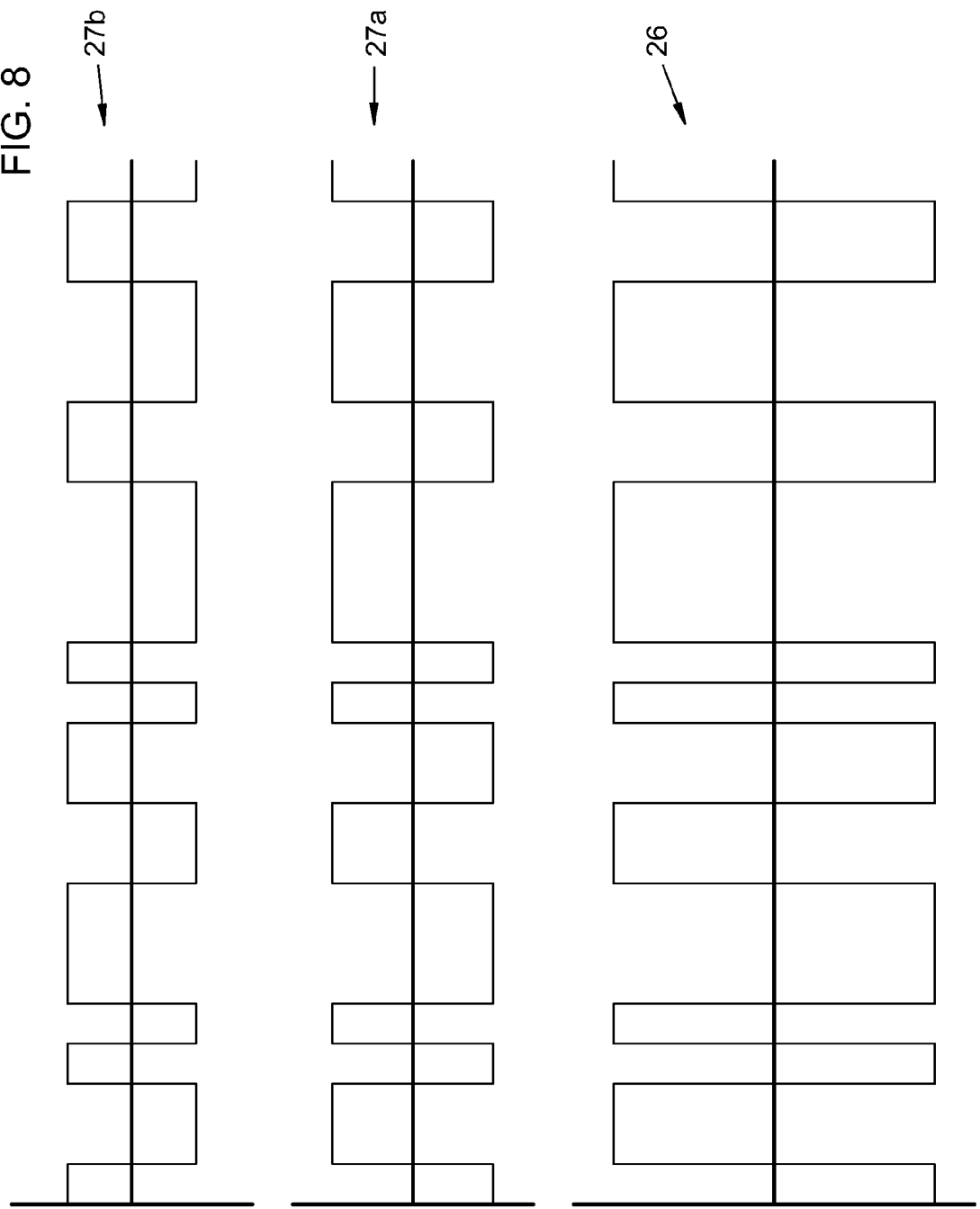
FIG. 8 illustrates schematically an input electrical signal and first and second portions of the input electrical signal produced by the drive circuit of FIG. 7.

The light source 116 has first and second electrical input leads 126a/126b for receiving respective portions 27a/27b of the input electrical signal 26. While the exemplary embodiments of the Figures show the input electrical signal 26 as a bipolar signals 26a/26b, drive circuit 250 can also be implemented to receive a unipolar input electrical signal 26 and generate first and second portions 27a/27b by methods known in the electrical or electronic arts, and such implementations utilizing a unipolar input signal shall fall within the scope of the present disclosure or appended claims. As described above, the drive circuit 250 is arranged to apply the first portion 27a of the input electrical signal 26 to the first electrical input lead 126a of the light source 116 and to apply the second portion 27b of the input electrical signal 26 to the second electrical input lead 126b of the light source 116. The drive circuit 250 is arranged so that the second portion 27b of the input electrical signal is a scaled, inverted substantial replica of the first portion 27a, as illustrated schematically in FIG. 8. The input electrical signal 26 may or may not include a DC offset (none shown in the example of FIG. 8). The portions 27a/27b of the input electrical signal 26 that are applied to the electrical input leads 126a/126b can each include a DC offset, which can be derived from the DC offset of the input electrical signal 26a/26b (if present therein), can be added or altered (at a suitable level) by the drive circuit 250, or can differ from one another.

In an exemplary embodiment, the light source 116 comprises a semiconductor light source, typically a laser diode. In such an embodiment, the first electrical input lead 126a comprises a cathode of the laser diode 116, and the second electrical input lead 126b comprises an anode of the laser diode 116. In a conventional laser drive circuit (such as that shown in FIG. 6), typically the unipolar input electrical signal 26 is applied only to the cathode of the laser diode 116 (via input lead 126a). The voltage of the laser diode cathode follows the temporal variations of the input electrical signal, while the voltage at the laser diode anode (input lead 126b) typically varies with substantially less amplitude. In many conventional laser drive circuits the laser diode anode is in fact RF-grounded by a relatively large capacitance to ground in parallel with and near to the connection to $V_{LS}$ (e.g., in FIG. 6 circuit 154 would comprise a single capacitor). In contrast, the drive circuit 250 (shown in FIG. 7) is arranged to deliver inverted, scaled replicas 27a/27b of the input electrical signal 26 to the electrical input leads 126a/126b of the laser diode 116. In the device of FIG. 7, voltages at both the laser diode anode and cathode vary according to the input electrical signal 26, but with smaller and opposite amplitudes (as signals 27a/27b); the overall voltage drop across laser diode 116 driven by drive circuit 250 can be similar to that driven by conventional drive circuit 150. It has been observed that the bidirectional optoelectronic device, arranged according to the present disclosure with drive circuit 250, exhibits lower electrical cross-talk than the conventional bidirectional device with drive circuit 150 (all other factors being equal, e.g., the amplitude of the electrical input signals, the types and relative positions of the photodetectors and light sources, and so forth; i.e., differing with respect to only the bipolar versus unipolar modulation of laser diode 116).

The reduction in electrical cross talk noted above is typically observed or operationally significant only under certain conditions, typically when the laser diode 116 and the photodetector 114 are positioned sufficiently close together. For example, in a bidirectional optoelectronic device (arranged as in FIG. 6) in which the photodetector 114 (a p-i-n photodiode) and the light source 116 (a laser diode) were positioned on a common substrate about 4 to 5 mm apart, a cross-talk penalty of only about 0.5 dBm due to operation of the laser diode was observed, which is typically tolerable under many common operational scenarios. However, in another example, a bidirectional optoelectronic device (arranged as in FIG. 6) in which the photodetector 114 (a p-i-n photodiode) and the light source 116 (a laser diode) were positioned on a common substrate about 2 mm apart, more significant degradation of photodetector performance due to operation of the laser diode was observed. Typically, a cross-talk penalty of about 4-5 dBm was observed.

Figure 9:
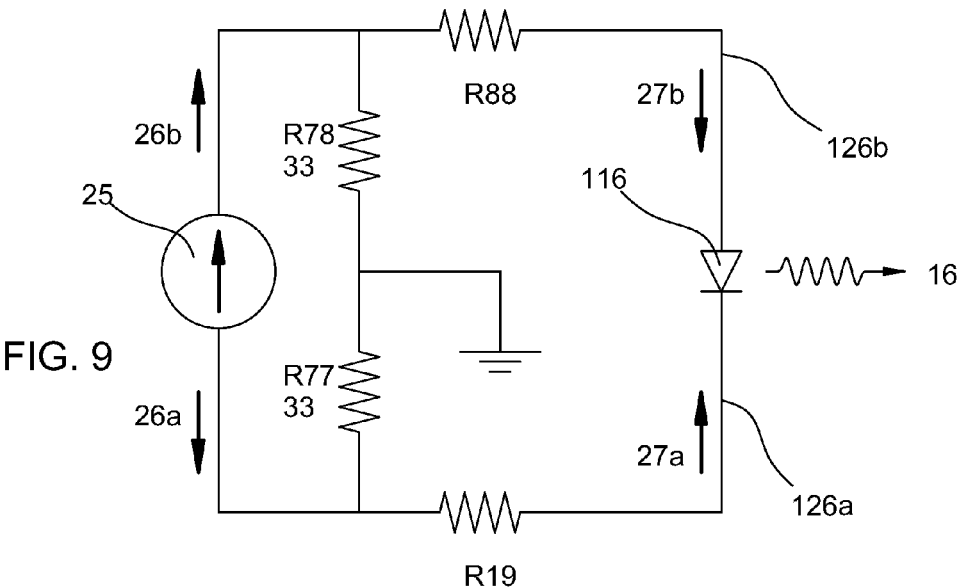
FIG. 9 illustrates schematically a portion of another exemplary drive circuit for a bidirectional optoelectronic device.

FIG. 9 illustrates a simplified portion of an exemplary drive circuit 250, in which a resistor network comprising R19, R77, R78, and R88 is employed to yield electrical signal portions 27a/27b from input electrical signal 26. R77 and R78 form a voltage divider that is grounded between its resistors, and the signal portions 27a/27b pass through resistors R19 and R88, respectively. As the values of R19 and R88 are varied (keeping R19+R88≈22Ω), the signal portions 27a/27b are inverted substantial replicas of one another with a relative absolute scale factor that varies and goes through a minimum scale factor near unity (when R19=R88=11Ω). That symmetric arrangement yields a cross-talk penalty of less than about 3 dBm when the input electrical signal is applied to the drive circuit 250 and light source 116, an improvement from the 4-5 dBm cross-talk penalty observed for photodetector 114 during operation of drive circuit 150 and light source 116.

Figure 10:
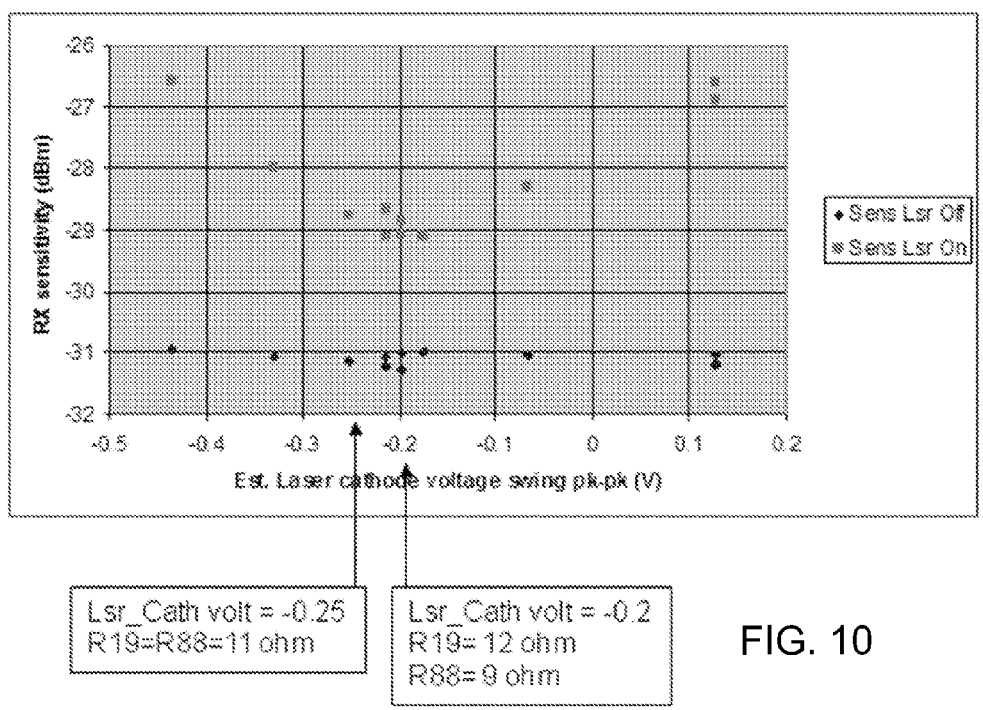
FIG. 10 is a plot of cross-talk penalty versus laser diode cathode voltage amplitude for the drive circuit of FIG. 9.

The symmetric arrangement of FIG. 9 does not, however, yield the greatest improvement over the arrangement of FIG. 6. An arrangement of drive circuit 250 with R19=12Ω and R88=9Ω yields a cross-talk penalty of only about 2.5 dBm, which appears to be the minimal cross-talk penalty achievable for the exemplary arrangement of FIG. 9. In that arrangement, the amplitude of voltage modulation of the laser anode (lead 126b) appears to be somewhat larger than the voltage modulation of the laser cathode (lead 126a, modulation inverted relative to that of the anode). For a given laser diode or other laser source 116, photodiode or other photodetector 114, spatial arrangement of the light source and photodetector, and particular arrangement of drive circuit 250, the relative amplitudes (i.e., scale factor) of the signal portions 27a/27b can be optimized to achieve a minimal cross-talk penalty when the input electrical signal is applied to the light source 116 through drive circuit 250 (illustrated in the plot of FIG. 10).

Figure 11:
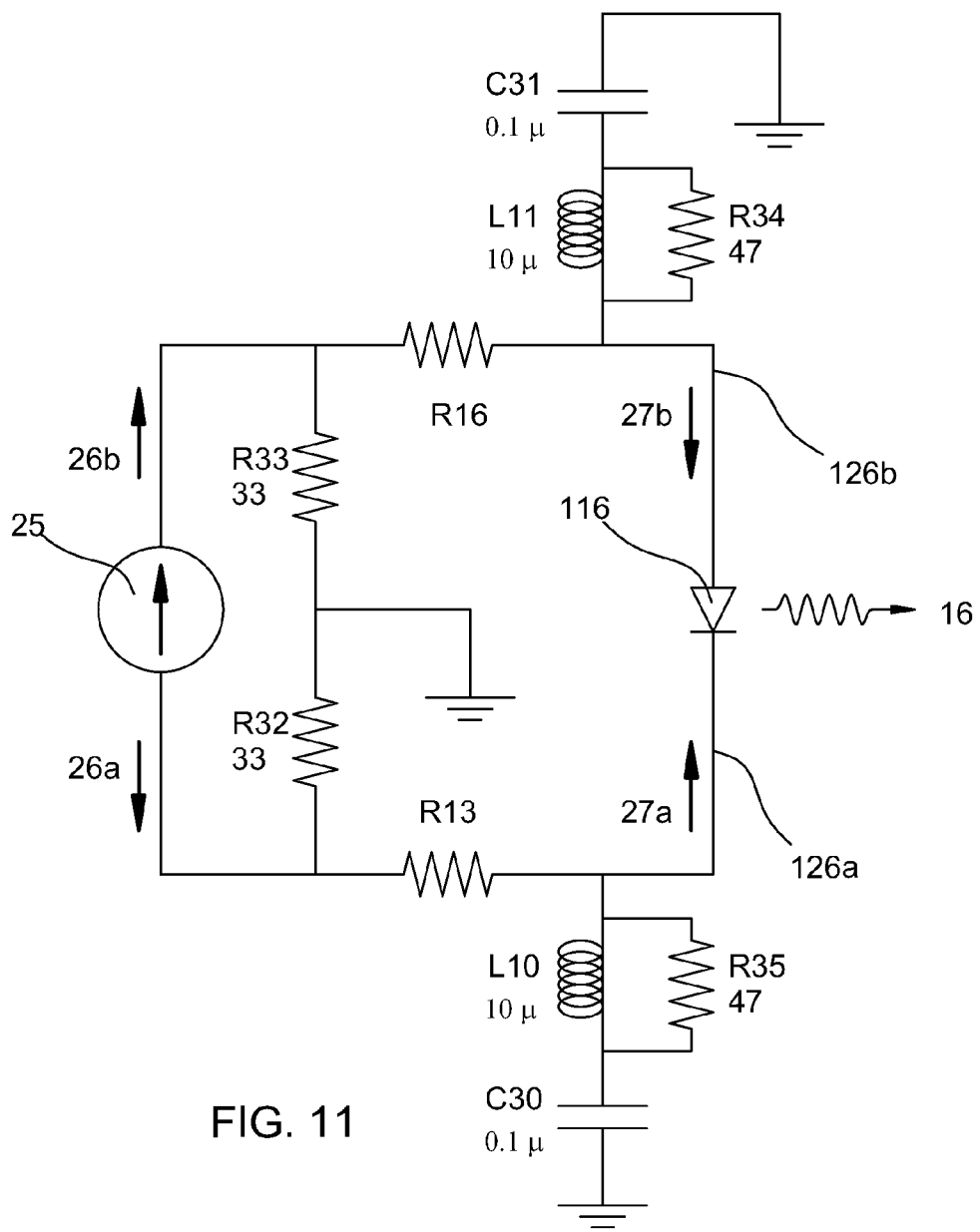
FIG. 11 illustrates schematically a portion of another exemplary drive circuit for a bidirectional optoelectronic device.

FIG. 11 illustrates a simplified portion of another exemplary drive circuit 250, similar to that of FIG. 9 but with additional details shown including RF equivalents of a bias circuit for the laser diode 116 (R34/35, C30/31, L10/11). As in the example of FIG. 9, a resistor network comprising R13, R16, R32, and R33 is employed to yield electrical signal portions 27a/27b from input electrical signal 26. R32 and R33 form a voltage divider that is grounded between its resistors, and the signal portions 27a/27b pass through resistors R13 and R16, respectively. As the values of R13 and R16 are varied (keeping R13+R16≈18Ω), the signal portions 27a/27b are inverted substantial replicas of one another with a relative absolute scale factor that varies and goes through a minimum scale factor near unity (when R13=R16=9Ω). That symmetric arrangement yields a cross-talk penalty of less than about 0.3 dB when the input electrical signal is applied to the drive circuit 250 and light source 116, an improvement from a cross-talk penalty of about 0.8-1.0 dB observed for photodetector 114 during operation of drive circuit 150 and light source 116 (arranged substantially as in FIG. 11 except for unipolar driving of the light source 116).

Figure 12:
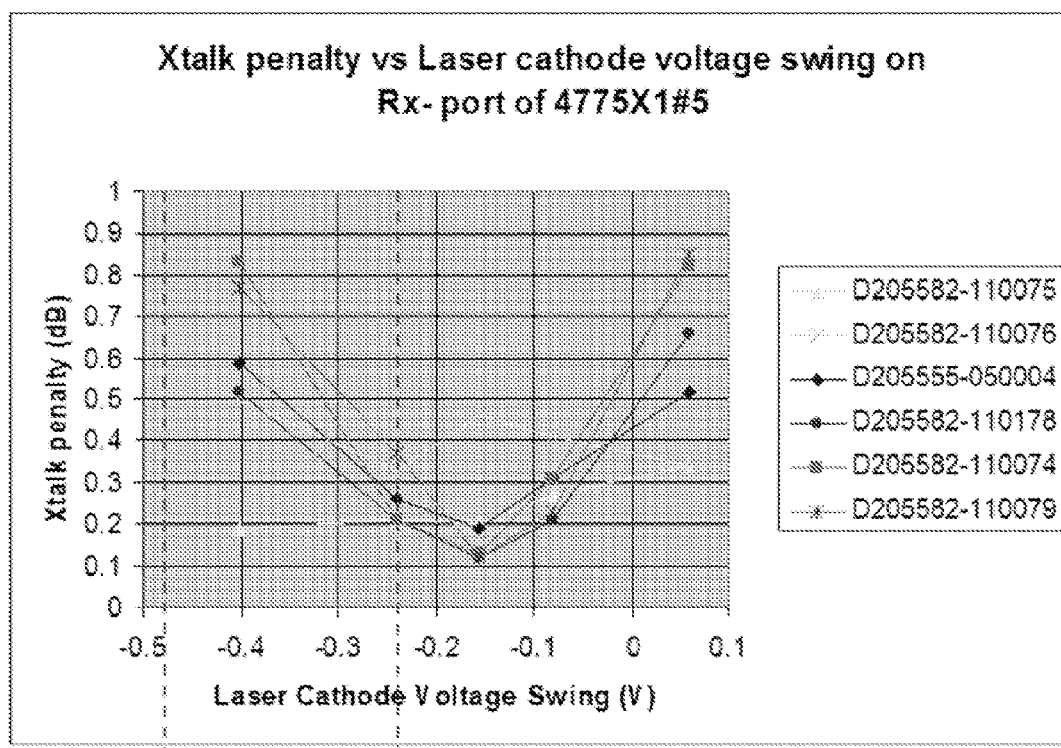
FIG. 12 is a plot of cross-talk penalty versus laser diode cathode voltage amplitude for the drive circuit of FIG. 11.

Again, the symmetric arrangement of FIG. 11 does not yield the greatest improvement over the arrangement of FIG. 6. An arrangement of drive circuit 250 with R13=11Ω and R16=6.8Ω yields a cross-talk penalty of only about 0.1-0.2 dB, which appears to be the minimum "cross-talk penalty" achievable for the exemplary arrangement of FIG. 11 (as shown in the plot of FIG. 12). In that arrangement, the amplitude of voltage modulation of the laser anode (lead 126b) appears to be somewhat larger than the voltage modulation of the laser cathode (lead 126a, modulation inverted relative to that of the anode). For a given laser diode or other laser source 116, photodiode or other photodetector 114, spatial arrangement of the light source and photodetector, and particular arrangement of drive circuit 250, the relative amplitudes (i.e., scale factor) of the signal portions 27a/27b can be optimized to achieve a minimal decrease on photodetector sensitivity when the input electrical signal is applied to the light source 116 through drive circuit 250.

Figure 13:
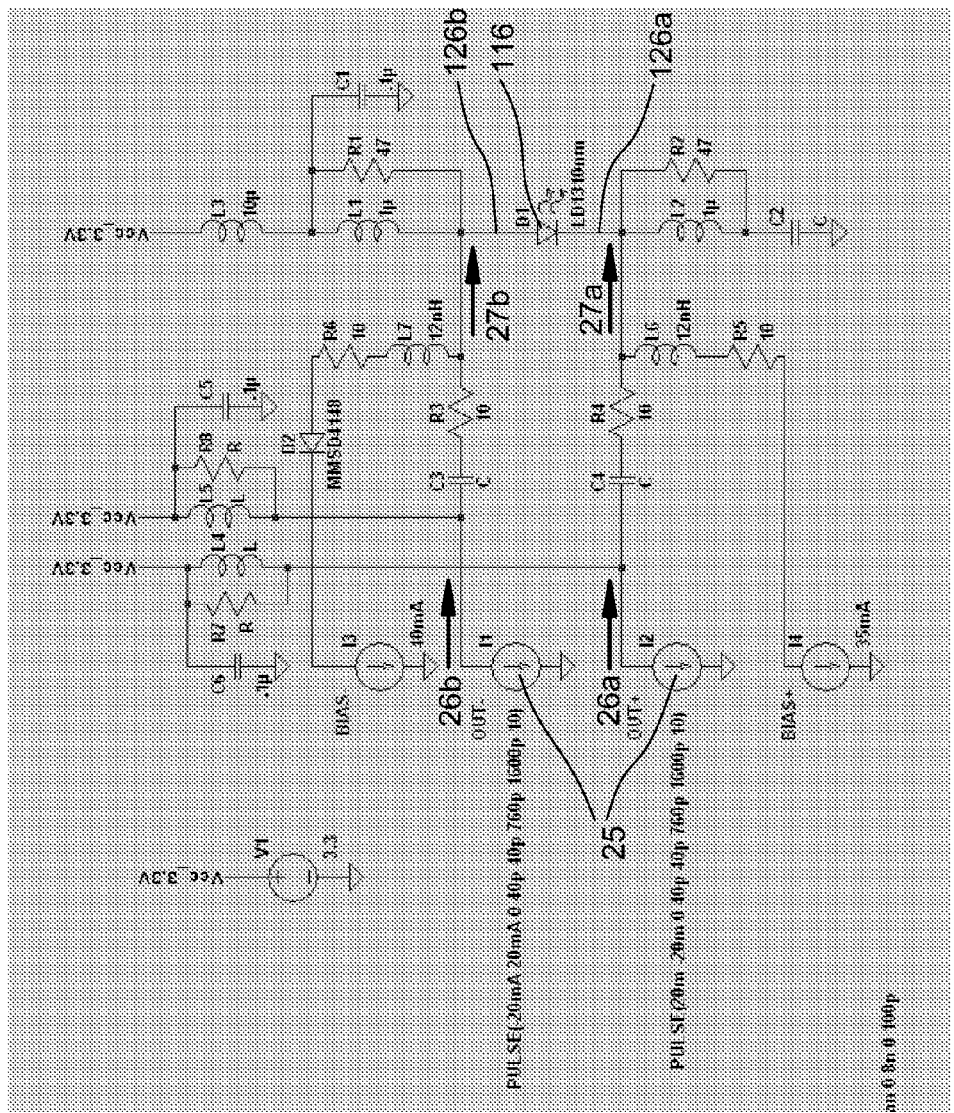
FIGS. 13 and 14 illustrate schematically portions of other exemplary drive circuits for a bidirectional optoelectronic device.
Figure 14:
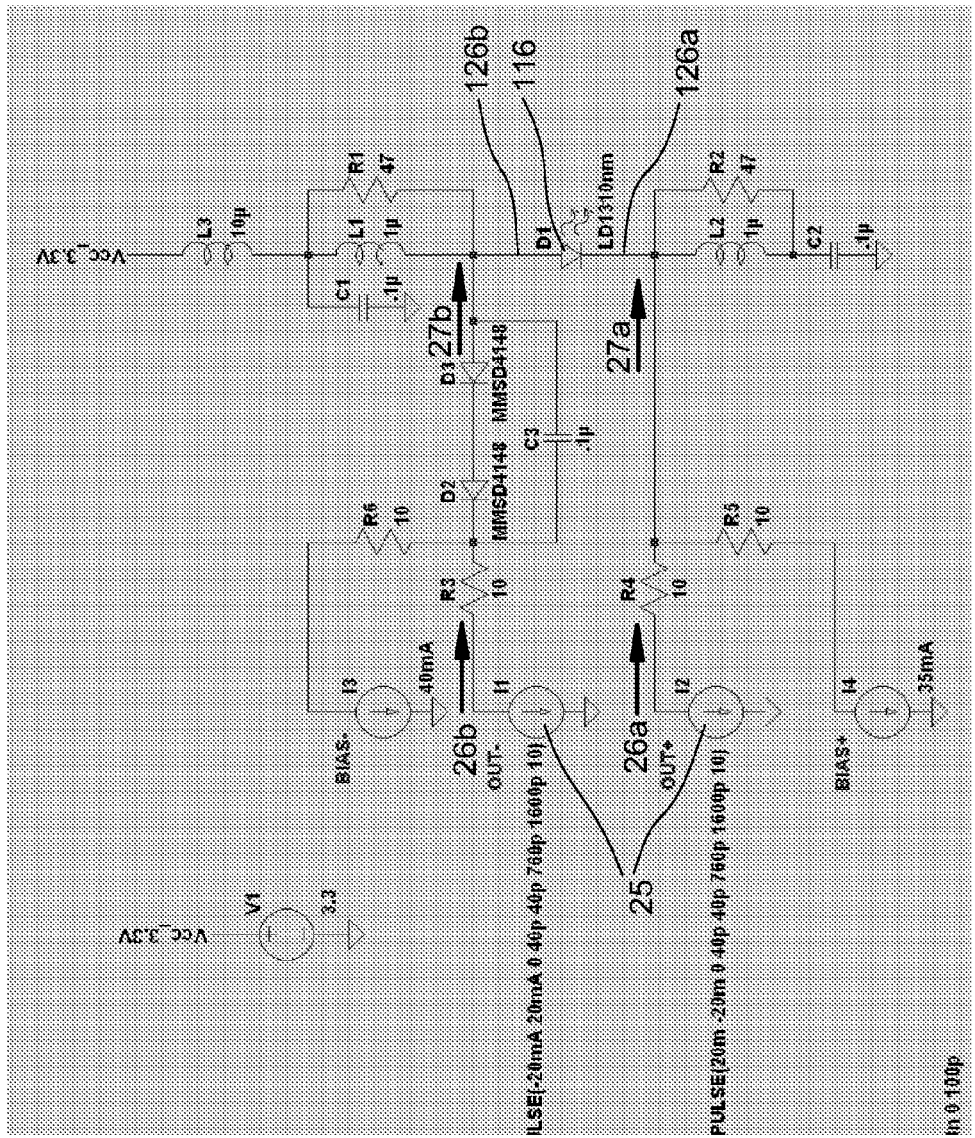

FIGS. 13 and 14 illustrate exemplary drive circuits 250 and laser diode 116 in more detail. The exemplary drive circuit 250 of FIG. 13 includes AC coupling of the input electrical signal 26 to the laser diode 116, and can be optimized for minimal cross-talk penalty (i.e., for maximal photodiode sensitivity during application of the input electrical signal 26 to the laser diode 116) by varying the values of, e.g., resistors R3 and R4. Alternatively, R7 and R8, R1 and R2, or various combinations of the three resistor pairs can be varied to achieve a minimal cross-talk penalty. If varying R1/R2 or R7/R8, then the associated reactive elements may need to be varied as well to maintain adequate phase matching of the laser anode and cathode voltages over the relevant frequency range. The exemplary drive circuit 250 of FIG. 14 includes DC coupling of the input electrical signal 26 to the laser diode 116, and can be optimized for minimal cross-talk by varying the values of, e.g., resistors R1 and R2. In that case, reactive elements (e.g., C1/C2 or L1/L2) may need to be varied as well in order to maintain adequate phase matching of the laser anode and cathode voltages over the relevant frequency range.

It is reiterated that the embodiments of FIGS. 7, 9, 11, 13, and 14 are exemplary, and many other circuits can be made that have more or fewer elements, or differing arrangements of elements, that nevertheless fall within the scope of the present disclosure or appended claims. In particular, some elements of the exemplary embodiments are optional and their presence is not necessarily required (e.g., diode D2 or inductors L4 and L5 in FIG. 8; diodes D2 and D3 in FIG. 9).

Light-Trapping Structure

The present disclosure is related to subject matter disclosed in (i) U.S. provisional App. No. 61/358,877 filed Jun. 25, 2010 in the name of Rolf A. Wyss and (ii) U.S. non-provisional App. No. 13/168,936 filed Jun. 25, 2011 in the names of Rolf A. Wyss, Joel S. Paslaski, Araceli Ruiz, and Peter C. Sercel. Both of said applications are incorporated by reference as if fully set forth herein.

A common configuration for an optoelectronic device includes a substrate 10 on which are formed one or more optical waveguides, and at least one light source mounted on the substrate and positioned to launch at least a portion of its optical output signal into an optical waveguide on the substrate. The optical signal thus launched propagates along the optical waveguide in a corresponding guided optical mode that is substantially confined in two transverse dimensions.

The optical waveguides typically are formed in one or more layers of suitable core or cladding materials grown, deposited, or otherwise formed on the substrate 10; those layers can be referred to collectively as optical waveguide layers 20. The substrate 10 acts as a structural support for the optical waveguide layers 20. Spatially selective processing of one or more of the optical waveguide layers 20 (by deposition, removal, or alteration of material) defines the optical waveguides; those processed layers (or processed regions of those layers) often act as waveguide cores having a refractive index somewhat higher than surrounding layers, which act as waveguide cladding. A typical waveguide substrate includes regions having only cladding layers and regions having one or more core layers in addition to cladding layers. In some examples of substrates having multiple-core waveguides, distinct regions can have differing numbers of core layers present, with the waveguide typically being defined by those regions where all core layers are present. Many other core/cladding configurations can be employed within the scope of the present disclosure.

It is often the case that optical coupling between the light source 116 and the optical waveguide 106 is imperfect, and that part of the optical signal emitted by the light source does not propagate in a guided optical mode as output optical signal 16, but instead escapes into the surroundings as unwanted optical signal 36. A certain fraction of that escaped, stray optical signal propagates in one or more of the optical waveguide layers 20, but without confinement by any of the optical waveguides in their corresponding optical modes. The stray optical signal that propagates in the optical waveguide layers can potentially interfere with or disrupt the performance of other optical components on the waveguide substrate, including optical detectors or other light sources. In particular, as noted above, in a multi-channel or bidirectional optoelectronic device (e.g., a bidirectional optoelectronic transceiver), the stray optical signal emitted by the light source and propagating in the optical waveguide layers can interfere with reception of an incoming optical signal 14 by a photodetector 114, decreasing the sensitivity of the photodetector 114 to the incoming optical signal 14 in the presence of the stray optical signal 36 (often described or quantified as the so-called "cross-talk penalty").

One way to decrease the negative impact of stray optical signals on the performance of an optoelectronic device is to provide a light-blocking or light-trapping structure on the waveguide substrate 10 or in the waveguide layers 20. Some examples of such structures are disclosed in:

U.S. Pat. No. 6,418,246 entitled "Lateral trenching for cross coupling suppression in integrated optical chips" issued Jul. 9, 2002 to Gampp;

U.S. Pat. No. 6,959,138 entitled "Planar optical waveguide" issued Oct. 25, 2005 to Steenblik et al;

U.S. Pat. No. 7,221,845 entitled "Planar optical waveguide" issued May 22, 2007 to Steenblik et al;

U.S. Pat. No. 7,276,770 entitled "Fast Si diodes and arrays with high quantum efficiency built on dielectrically isolated wafers" issued Oct. 2, 2007 to Goushcha et al;

U.S. Pat. No. 7,530,693 entitled "Single MEMS imager optical engine" issued May 12, 2009 to Mihalakis;

U.S. Pat. Pub. No. 2002/0137227 entitled "Chemiluminescent gas analyzer" published Sep. 26, 2002 in the name of Weckstrom;

U.S. Pat. Pub. No. 2004/0151460 entitled "Deep trenches for optical and electrical isolation" published Aug. 5, 2004 in the names of Kitcher et al;

U.S. Pat. Pub. No. 2005/0105842 entitled "Integrated optical arrangement" published May 19, 2005 in the names of Vonsovici et al;

U.S. Pat. Pub. No. 2008/0019652 entitled "Planar optical waveguide" published Jan. 24, 2008 in the names of Steenblik et al; and U.S. Pat. Pub. No. 2009/0080084 entitled "Beam dump for a very-high-intensity laser beam" published Mar. 26, 2009 in the names of Pang et al.

FIGS. 15 through 20 illustrate schematically an improved light-trapping structure (i.e., one or more light collectors and one or more light traps) formed on a waveguide substrate 10 or optical waveguide layers 20 thereon.

Figure 15:
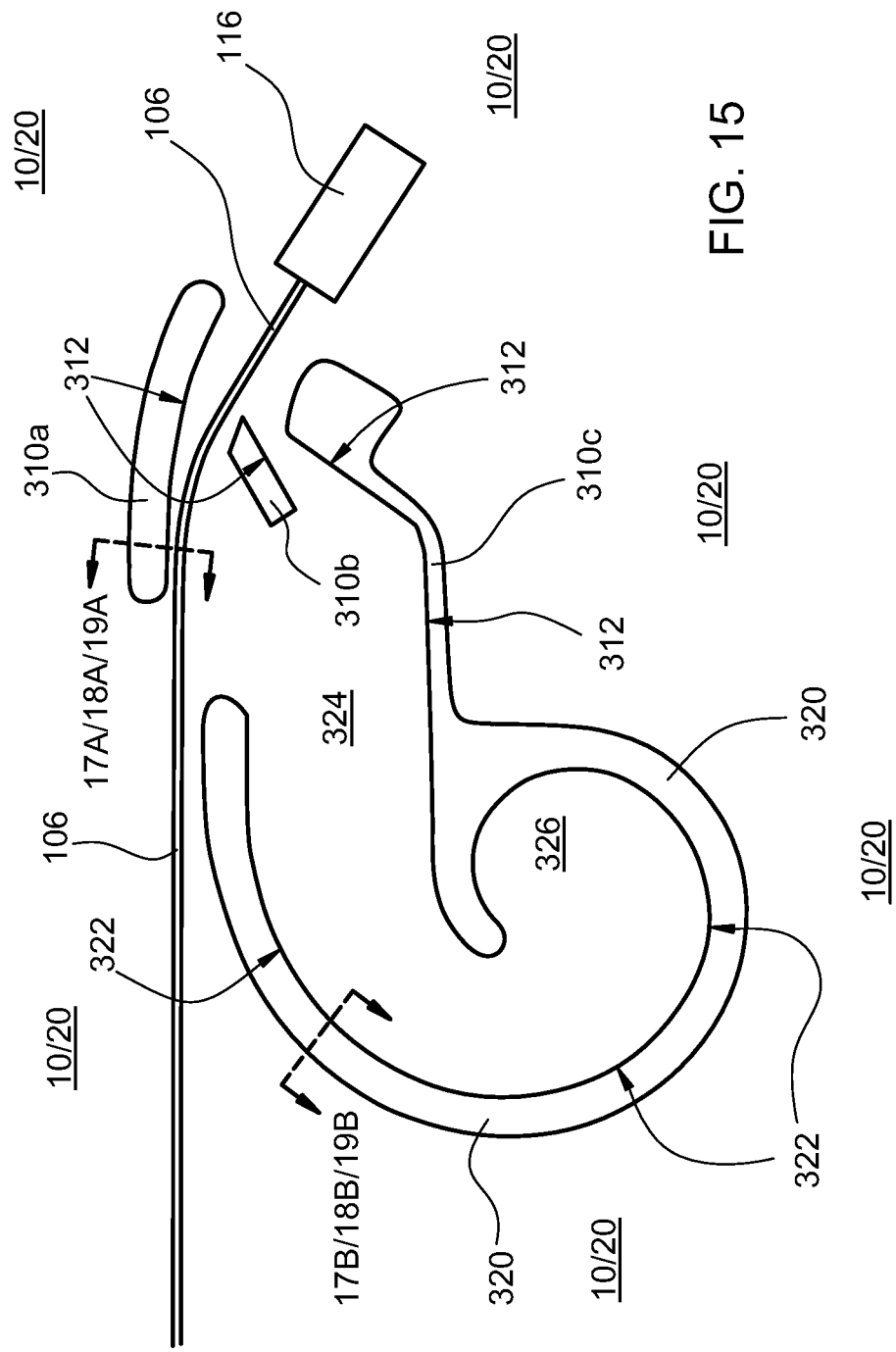
FIG. 15 is a schematic plan view of a light source, waveguide, and exemplary light-trapping structure on a waveguide substrate.
Figure 16:
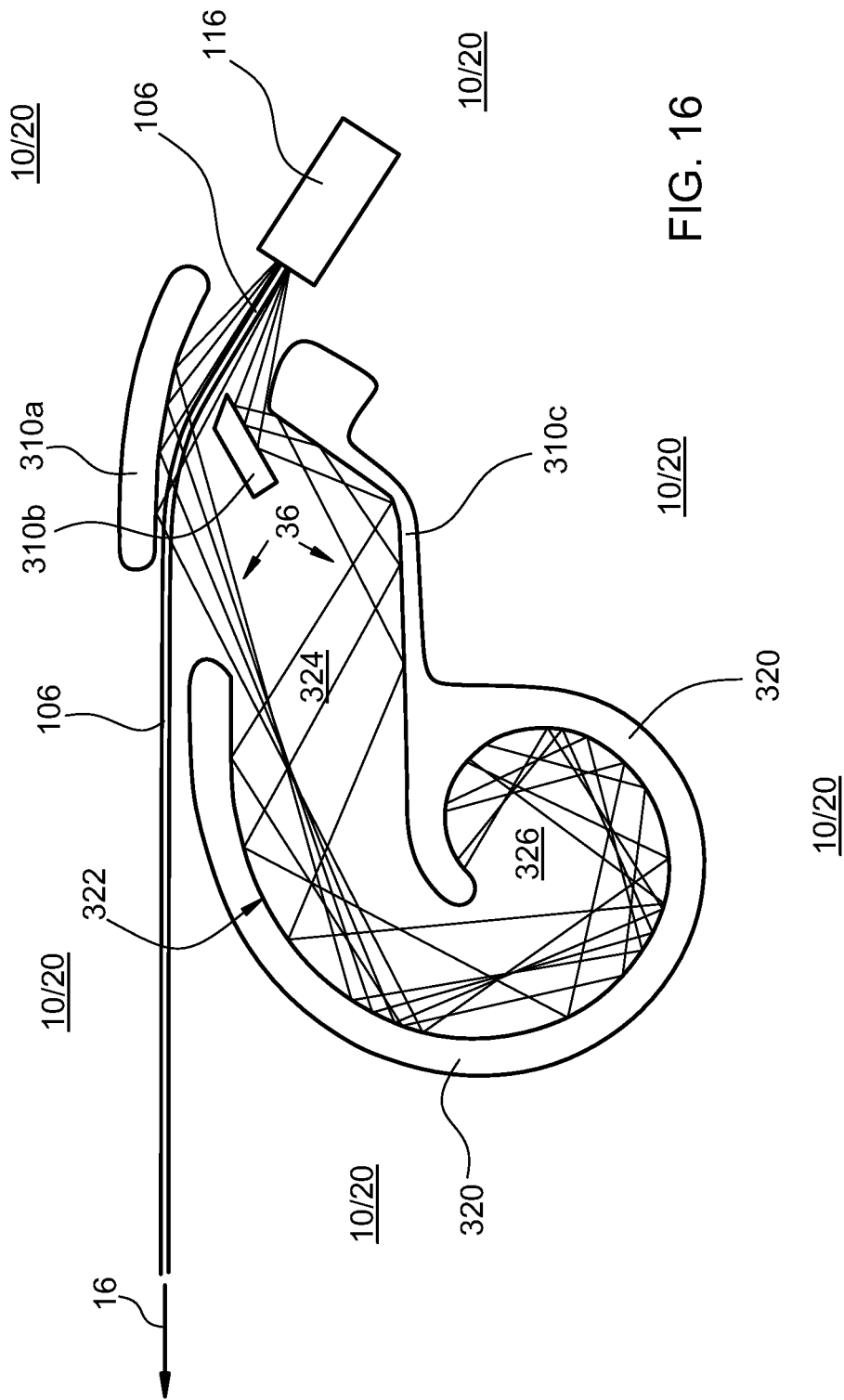
FIG. 16 is a schematic plan view of a light source, waveguide, and exemplary light-trapping structure on a waveguide substrate showing paths of guided and stray optical signals.

In FIGS. 15 and 16, an optical waveguide 106 of any suitable type or configuration is formed in optical waveguide layers 20 on a waveguide substrate 10. The optical waveguide layers 20 and the waveguide substrate 10 can comprise any of myriad suitable materials while remaining within the scope of the present disclosure or appended claims. In a common implementation, substrate 10 comprises silicon, and the waveguide layers 20 can include one or more of silica, doped silica, silicon nitride, or silicon oxynitride. Some suitable examples of optical waveguides are disclosed in co-owned U.S. Pat. Nos. 6,975,798; 7,136,564; 7,164,838; 7,184,643; 7,373,067; 7,394,954; 7,397,995; or 7,646,957, or co-owned Pub. No. 2010/0092144, which are hereby incorporated by reference.

A light source 116 is positioned on substrate 10 or on one or more of the waveguide layers 20, and is positioned to launch an optical signal (or at least a first fraction 16 of the optical signal, referred to hereafter as the launched optical signal 16) to propagate along optical waveguide 106 as a guided optical mode substantially confined by the waveguide 106 in two transverse dimensions. A second, stray fraction 36 of the optical signal (referred to hereafter as the stray optical signal 36) propagates from the light source 116 in the optical waveguide layers 20 without confinement by the waveguide 106 in the guided optical mode. The light source 116 can comprise any source of optical signals 16 or 36, including but not limited to: a laser diode or light-emitting diode, an optical fiber, another optical waveguide on a separate substrate, or a beamsplitter or tap, any of which can be formed or mounted on the substrate 10 or waveguide layers 20.

Figure 17A:
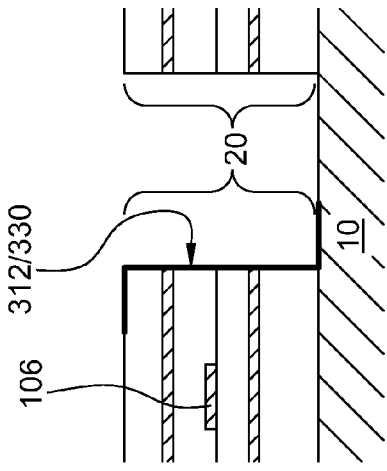
FIGS. 17A, 18A, and 19A are schematic cross-sectional views of various exemplary lateral surfaces of the optical waveguide layers and substantially opaque coatings formed near an optical waveguide.
Figure 18A:
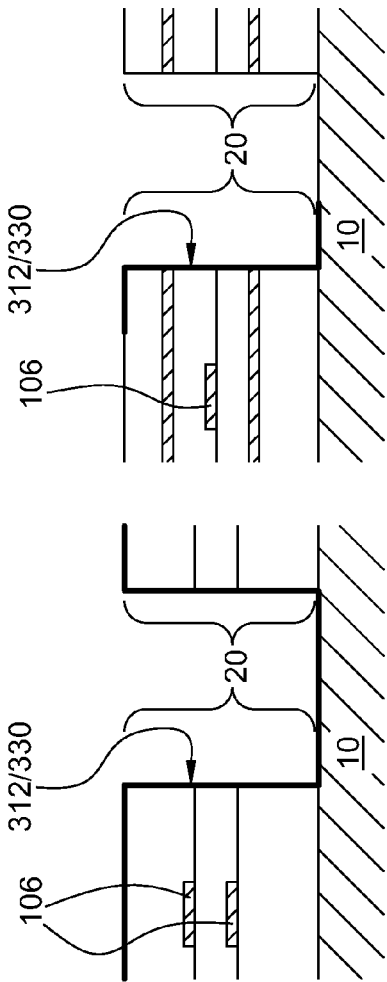
Figure 19A:
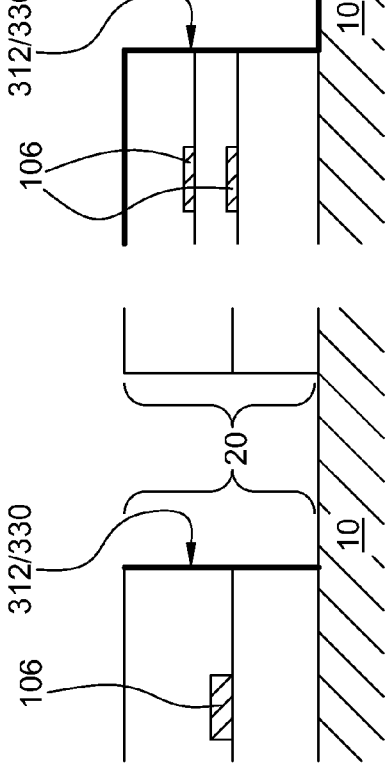
Figure 17B:
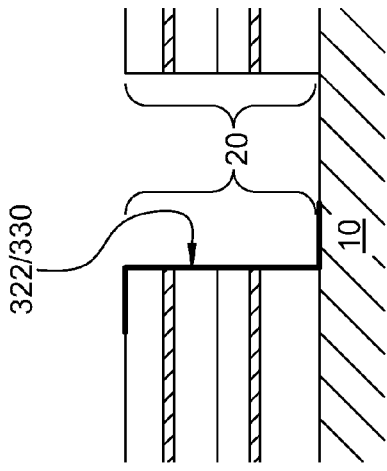
FIGS. 17B, 18B, and 19B are schematic cross-sectional views of various exemplary lateral surfaces of the optical waveguide layers and substantially opaque coatings formed away from any optical waveguide.
Figure 18B:
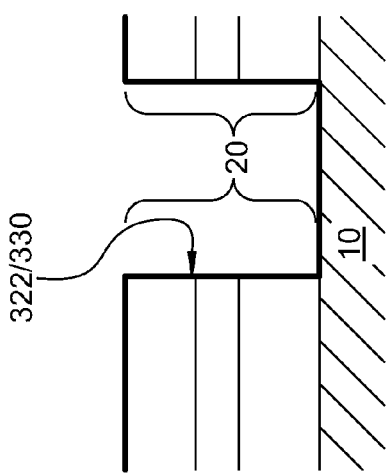
Figure 19B:
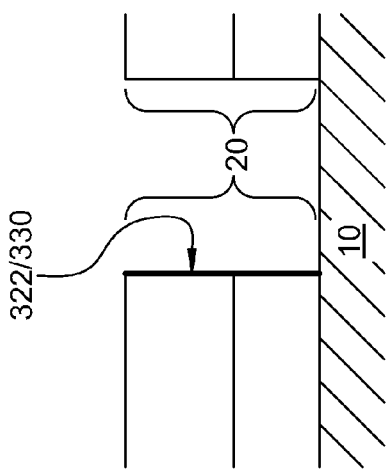
Figure 20:
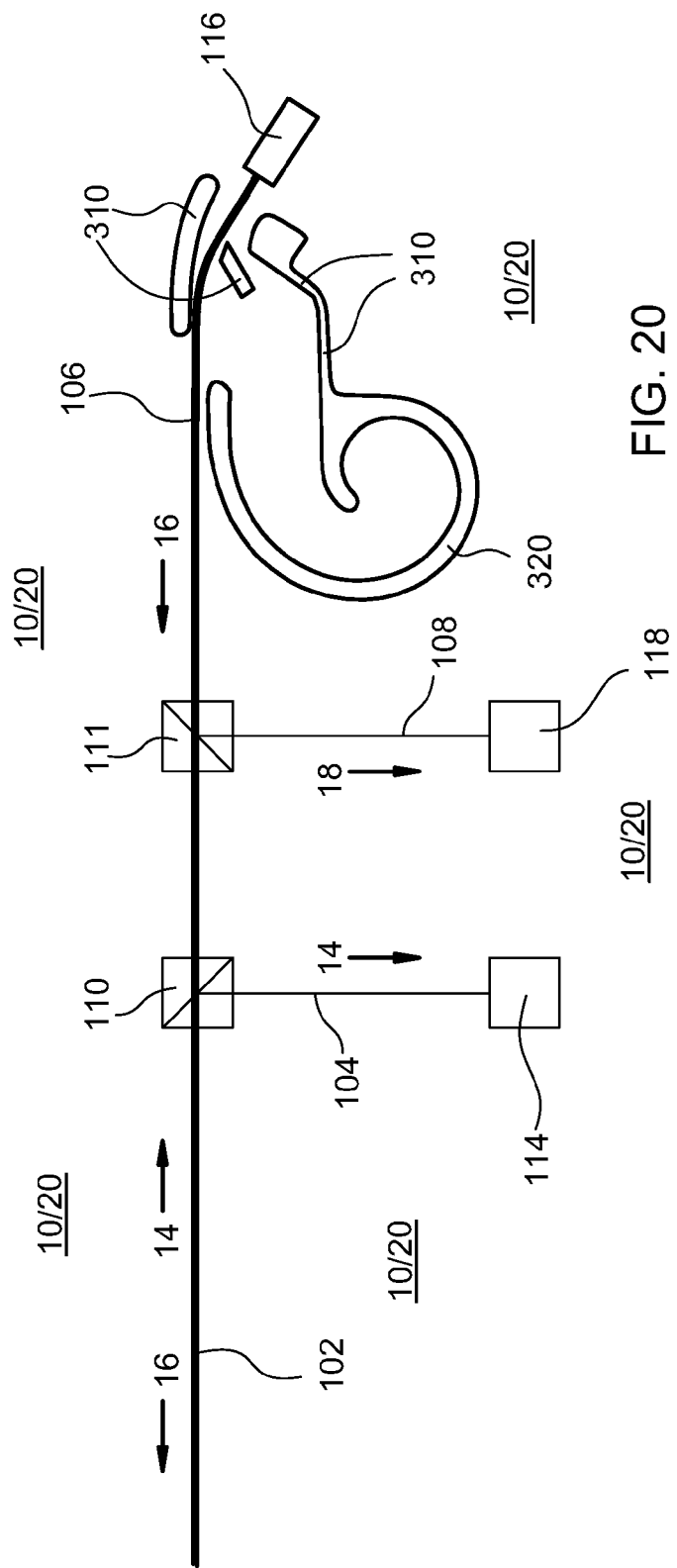
FIG. 20 is a schematic plan view of an exemplary bidirectional optoelectronic device including an exemplary light-trapping structure.

Without any light-trapping structure, the stray fraction 36 of the optical signal could propagate through the optical waveguide layers 20 and potentially interfere with or disrupt the performance of other optical components on the substrate 20. FIGS. 15 and 16 illustrate schematically a light-trapping structure that includes light collectors 310a/310b/310c (referred to generically as light collector 310x or collectively as light collectors 310) and a light trap 320. Although three light collectors 310 and one light trap 320 are shown in the exemplary embodiment of the drawings, any suitable number of one or more light collectors or one or more light traps can be employed within the scope of the present disclosure or appended claims. Each light collector 310x comprises one or more lateral surfaces 312 of the optical waveguide layers 20 and a substantially opaque coating 330 on the lateral surfaces 312 (FIGS. 17A/18A/19A). Each light trap 320 comprises one or more lateral surfaces 322 of the optical waveguide layers 20 and a substantially opaque coating 330 on the lateral surfaces 322 (FIGS. 17B/18B/19B). The lateral surfaces 312/322 typically are substantially perpendicular to the substrate 10 and optical waveguide layers 20, i.e., they are substantially vertical relative to the horizontal substrate 10. The designations horizontal and vertical are relative and are not intended to designate absolute spatial orientation. Although FIGS. 17A/18A/19A show the lateral surface 312 formed near a waveguide 106 (as is the case for light collector 310a, for example), a light collector 310x can be formed in any suitable location on substrate 10, including locations away from any waveguide (which would therefore resemble FIGS. 17B/18B/19B). Likewise, although FIGS. 17B/18B/19B show the lateral surface 322 formed away from any waveguide, a light trap 320 can be formed in any suitable location on substrate 10, including locations near a waveguide 106 (which would therefore resemble FIGS. 17A/18A/19A).

The stray optical signal 36 propagates from light source 116 within the optical waveguide layers 20, encounters a lateral surface 312 and its substantially opaque coating 330, and is prevented from propagating further in that direction. The coating 330 typically absorbs a fraction of the incident light and reflects the rest. The lateral surface 312 of each light collector 310x is arranged to direct the reflected portion of the stray optical signal toward the light trap 320 (either directly or after redirection by another light collector 310x).

The lateral surfaces 322 and substantially opaque coatings 330 of the light trap 320 define a corresponding spiral region of the optical waveguide layers 20. That spiral region includes an open mouth 324 and a closed end 326. Portions of the stray optical signal 36 that propagate in the optical waveguide layers 20 into the open mouth 324 are repeatedly reflected from the surface 322 and coating 330 further into the spiral region until reaching the closed end 326 (as shown in FIG. 16). Typically, upon each reflection a portion of the stray optical signal 36 is absorbed and the rest is reflected. The spiral region can be arranged in any suitable way, and typically subtends an arc greater than about 180°. In some embodiments, the spiral region can be a cornuate spiral region (i.e., a tapered, horn-shaped spiral that tapers toward the closed end 326).

The substantially opaque coating 330 typically is arranged to exhibit optical absorption over the operational wavelength range of the light source 330, to effect attenuation of the stray optical signal 36 as it is repeatedly reflected from lateral surfaces 312/322. A metal coating can often be employed to provide substantial opacity and a suitable degree of optical absorption. In one example, chromium or titanium can be employed over an operational wavelength range of about 1200-1700 nm; any other suitable metal usable over any other suitable wavelength range shall fall within the scope of the present disclosure or appended claims. A thickness of coating 330 greater than about 150 nm can typically provide a sufficient degree of opacity, and larger thicknesses can be employed to ensure adequate opacity. In one example, wherein a chromium or titanium layer is deposited on the lateral surfaces 312/322 of optical waveguide layers 20 that comprise, e.g., silica, silicon nitride, or other dielectric materials of similar refractive index, about 45% of the incident stray optical signal 36 is absorbed and about 55% of the stray optical signal 36 is reflected. Each ray representing the stray optical signal 36 undergoes 4 to 6 or more reflection before reaching the closed end 326 of the light trap 320, so that only about 3% (after 6 reflections) to about 9% (after 4 reflections) of the original optical power remains in the stray optical signal 36 upon reaching the closed end 326 of the light trap 320. At that low level the stray optical signal 36 is less likely to interfere with or disrupt operation of other optical devices on the substrate. If upon additional reflections a portion of the stray optical signal 36 reemerges from the light trap through its open mouth 324, it typically would be attenuated to a substantially negligible level (e.g., less than about 1% or even less than about 0.1%).

A reflection suppressing layer (i.e., anti-reflection coating) can be employed as a portion of coating 330, between the lateral surface 312/322 and the metal absorbing layer. Reduction of the amount of light reflected (and concomitant increase in the amount absorbed) upon each encounter with a surface 312/322 enhances the attenuation of the stray optical signal 36 as it repeatedly encounters surfaces 312/322. Any suitable reflection suppression layer or anti-reflection coating can be employed. Some examples are disclosed in co-owned Pub. No. US 2006/0251849, which is hereby incorporated by reference.

The lateral surfaces 312/322 in the examples of FIGS. 17A/18B, 18A/18B, and 19A/19B, are shown extending through the entirety of the optical waveguide layers 20 but not extending into the waveguide substrate 10. Other suitable depths can be employed within the scope of the present disclosure or appended claims. It is typically preferable for the lateral surface 312/322 to extend through the entirety of the optical waveguide layers 20. The lateral surfaces 312/322 can extend into the waveguide substrate 10. It may often occur that the optical waveguide layers 20, waveguide 106, surfaces 312/322, and coating 330 are formed or deposited on a wafer scale to fabricate light collectors and traps on many waveguide substrates simultaneously. The lateral surfaces 312/322 can be formed during such wafer-scale fabrication, e.g., by any suitable dry or wet etch process, typically by etching one or more trenches into the optical waveguide layers 20 (and perhaps extending into the substrate 10, as noted above).

As shown in the exemplary arrangements of FIGS. 17A/17B, 18A/18B, or 19A/19B, differing arrangements for the layer 330 can be employed. In the arrangement of FIGS. 17A/17B, the coating 330 overlies only the lateral surface 312/322. Practically, that may be all that is needed, but also practically, that arrangement can be difficult to achieve, particularly using standard lithographic deposition techniques to form light collectors and traps on many waveguide substrates simultaneously. Conformal (i.e., non-directional) deposition techniques are not well-suited for selective coverage of only surfaces of a particular orientation, and directional deposition techniques are not well-suited for selective coverage of only vertical surfaces. The arrangement of FIGS. 18A/18B can be the easiest to achieve, by simply coating all, or nearly all, of the exposed surface of the waveguide substrate 10 and optical waveguide layers 20. That approach can be employed if there is no reason to avoid the presence of coating 330 over the waveguide 106 or other portions of the waveguide substrate 10 or optical waveguide layers 20, and if a deposition can be employed that is at least somewhat conformal. An intermediate approach is illustrated by the exemplary arrangement shown in FIGS. 19A/19B, in which the coating 330 extends partly across horizontal surfaces of waveguide substrate 10 or optical waveguide layers 20. Portions of the substrate 10 or waveguide layers 20 can be masked to prevent deposition of the coating 330 onto areas where it would be undesirable.

Differing arrangements of the optical waveguide 106 and the optical waveguide layers 20 are shown in the exemplary arrangements of FIGS. 17A/17B, 18A/18B, or 19A/19B. Any of the waveguide arrangements in those examples can be employed in any combination with any of the arrangements shown for coating 330 in those examples. In the example shown in FIGS. 17A/17B, the optical waveguide 106 comprises a single, higher-index core between top and bottom lower-index cladding layers. A lateral surface 312 is shown near the waveguide 106 in FIG. 17A, while only the two cladding layers are present near the lateral surface 322 shown in FIG. 17B. In the example shown in FIGS. 18A/18B, the optical waveguide 106 comprises a pair of higher-index cores and top, middle, and bottom lower-index cladding layers. A lateral surface 312 is shown near the waveguide 106 in FIG. 18A, while only the three cladding layers are present near the lateral surface 322 shown in FIG. 18B. In the example shown in FIGS. 19A/19B, the optical waveguide 106 comprises one higher-index core and two higher-index core layers, and the cladding comprises top, upper middle, lower middle, and bottom lower-index cladding layers. A lateral surface 312 is shown near the waveguide 106 in FIG. 19A, while the four cladding layers and the two core layers (without the core) are present near the surface lateral 322 shown in FIG. 19B. Boundaries are shown between the various cladding layers to indicate where cladding deposition is interrupted to allow deposition or patterning of an intervening core or core layer, however, such boundaries may or may not be readily apparent in the finished device, particularly if the same material is used for the different cladding layers.

In the exemplary embodiment of FIGS. 15 and 16, a first light collector 310a is curved so as to reflect and redirect a portion of the stray optical signal 36 that diverges from the light source 116 to converge toward the open mouth 324 of the light trap 320. The collector 310a can, for example, approximate a portion of an ellipse with the light source 116 positioned near one focus of the ellipse and the open mouth 324 of the light trap 320 positioned near the other focus of the ellipse. The arrangement of light collector 310a is only exemplary; other arrangements of a curved light collector surfaces can be employed.

Also in the exemplary embodiment of FIGS. 15 and 16, light collectors 310b and 310c have one or more flat surfaces 312 that are arranged to redirect the stray optical signal 36 (one such surface 312 for light collector 310b; three distinct flat segments for light collector 310c). Those various flat surfaces 312 are arranged to redirect, by two or more successive reflections, a portion of the stray optical signal 36 into the mouth 324 of light trap 320. The arrangement of light collectors 310b and 310c are only exemplary; other arrangements of flat light collector surfaces can be employed.

To further reduce the amount of the stray optical signal 36 that avoids the light collectors and light traps, the optical waveguide 106 can include a curved segment. The optical waveguide can pass, before its curved segment, between the light collectors 310a and 310b. The waveguide can pass, after its curved segment, between the light collector 310a and the open mouth 324 of the light trap 320. The light collector 310b is arranged so as to substantially block substantially all straight-line propagation paths from the light source 116 through the optical waveguide layers 20 that lie between the first light collector 310a and the mouth 324 of the light trap 320.

Light collectors and light traps disclosed herein can be employed in a wide variety of optoelectronic devices that are realized using an optical waveguide on a waveguide substrate. One such example is illustrated schematically in FIG. 20, and includes beamsplitters 110 and 111 and photodetectors 114 and 118. The light source 116 emits a launched optical signal 16 that propagates along optical waveguide 106. A portion 18 is split off by beamsplitter 111 and directed to photodetector 118. The electrical signal from photodetector 118 can be employed, e.g., for feedback control of the light source 116. The remainder of the launched optical signal 16 propagates along optical waveguide 106 until it leaves the device. An incoming optical signal 14 entering the device propagates along waveguide 106 until it is directed to photodetector 114 by beamsplitter 110. Performance of either or both of the photodetectors 114/118 can be affected by the stray optical signal 36 propagating in the optical waveguide layers 20; those effects can be reduced or eliminated by the presence of light collectors 310 and light trap 320. The beamsplitters 110/111 can be implemented in any suitable way while remaining within the scope of the present disclosure or appended claims. A waveguide beamsplitter or tap can be employed (e.g., as disclosed in co-owned patents and publications already incorporated by reference). Alternatively, the optical waveguide 106 can include a gap across which an optical signal 14, 16, or 18 can propagate as a free-space optical beam (i.e., unguided) between segments of the waveguide. A beamsplitter can be inserted between the waveguide segments for directing various free-space optical signals to propagate along other waveguides (e.g., as disclosed in co-owned patents and publications already incorporated by reference). It should be noted that beamsplitters 110/111, however implemented, can themselves act as a light source 116 and as a source of a stray optical signal 36. It can be desirable to provide one or more light collectors 310 or light traps 320 to reduce propagation of stray optical signals arising from a beamsplitter for an optical waveguide, and such implementations shall fall within the scope of the present disclosure or appended claims.

Multi-Function Encapsulation

In an exemplary embodiment of a multi-channel or bidirectional optical device according to the present disclosure, a multi-purpose encapsulant 500 is employed to encapsulate the multi-channel or bidirectional optoelectronic device, including one or more signal photodetectors 114, one or more light sources 116, one or more monitor photodetectors 118 (if present), optical waveguides 102 (if present), 104, 106, and 108 (if present), conductive traces 124, 126, and 128 (if present), and conductive wire leads 134, 136, and 138 (if present). If other optical or electrical elements are employed instead of or in addition to those listed, those can be encapsulated as well (or instead).

One purpose of the encapsulant 500 is to provide chemical and mechanical protection for the photodetector(s), light source(s), waveguides, and electrical connections of the bidirectional device; encapsulant 500 can therefore be referred to as a protective encapsulant. The components of the device can be relatively delicate, can be deployed in relatively hostile environments (large temperature swings, high humidity, and so on), or can endure rough handling or treatment during installation or while deployed. For one or more of those reasons, it has been conventional to encapsulate the delicate portions of such devices. Typically, the protective encapsulant can comprise a suitable polymer (e.g., silicone, epoxy, or polyurethane polymer; an optically transparent polymer can be preferred in some instances), which is applied in its uncured form (typically liquid or semi-liquid) onto the substrate 10 on which are positioned the components of the bidirectional device (as in the side elevation view of a bidirectional device illustrated schematically in FIG. 21, for example; much structural detail and all signals are omitted for clarity). If the substrate 10 is mounted on another, larger substrate or circuit board, the encapsulant can extend beyond substrate 10 onto that other substrate or board. The encapsulant 500 can be selected on the basis of a variety of its properties, depending on the nature of the bidirectional device and the intended deployment environment. The uncured encapsulant is preferably sufficiently fluid to substantially fill in the topography of the bidirectional device (e.g., to fill spaces between components, to completely flow around wire leads, etc.), sufficiently viscous to remain in place during application and curing, sufficiently hard after curing to provide adequate mechanical support and protection, sufficiently soft after curing so that thermal expansion or contraction does not unduly stress or even break the device or any of its components (including, e.g., interconnections such as wires), and chemically resistant to a suitable array of substances likely to be encountered in the use environment (e.g., water vapor in humid environments). Examples of suitable encapsulants include, but are not limited to, silicone rubbers, gels, epoxies, or polyurethanes.

The encapsulant 500 can further comprise an optical absorber. The absorber can be any substance that can be mixed into the encapsulant formulation without substantially disrupting the suitability of its physico-chemical properties (before or after curing). The absorber can be dissolved, suspended, or otherwise dispersed in the uncured encapsulant (and remain there during application and after curing), and absorbs light at one or more wavelengths of optical signals 14 and 16. As a result of mixing such an absorber into the encapsulant 500, portions of unwanted optical signals 34/36/38 that propagate above the substrate 10 (i.e., within the encapsulant 500) are attenuated. A protective encapsulant 500 that includes an optical absorber therefore can act to reduce optical cross-talk arising from those unwanted optical signals.

A suitably chosen dye can be dissolved in the encapsulant 500 to act as an optical absorber. Instead or in addition, insoluble particles 510 can be suspended in the encapsulant to act as the optical absorber (FIGS. 22 and 24). Examples of suitable particles can include carbon particles (e.g., carbon black, lamp black, or acetylene black), mineral pigments (e.g., black ferrites or hematites, black spinels, cobalt black, manganese black, mineral black, or black earth), metal particles, or semiconductor particles, preferably having a mean particle size between about 0.01 μm and about 50 μm. A preferred example includes carbon black particles having an average particle size between about 20 μm and about 30 μm, and comprising between about 0.1% and about 2% of the encapsulant composition by weight. The absorber (whatever its type or composition) can be present in an amount to yield an extinction coefficient $\kappa$ (over an operationally relevant wavelength range) between about 1-5 cm$^{-1}$ and about 200 cm$^{-1}$ (where the absorption coefficient $\kappa$ is defined by transmitted optical power divided by incident optical power being equal to $e^{-\kappa L}$, where L is an optical path length through the encapsulant). Reductions in optical cross-talk penalty between about 1 dB and about 5 dB have been observed when an optical absorber is incorporated into the encapsulant 500 (relative to the observed optical cross-talk penalty of the same device with the same encapsulant but without the optical absorber).

By reducing the average or effective dielectric constant of the protective encapsulant 500, the level of electrical cross-talk in the bidirectional device that arises from the portion of the unwanted electrical signals 44/46/48 propagating above the substrate 10 can be reduced, relative to the electrical cross-talk that would be present with an encapsulant having a higher dielectric constant. To reduce the average dielectric constant of encapsulant 500, it can include suspended, hollow, dielectric microspheres 520 (FIGS. 23 and 24). Such microspheres are available commercially in a variety of sizes, and often comprise silica-based glass. In an exemplary embodiment, hollow silica microspheres are employed that have a median diameter of about 60 μm and a range of diameters from about 30 μm to about 105 μm (10$^{th}$ percentile to 90$^{th}$ percentile) or from about 10 μm to about 120 μm (overall range); other suitable materials or sizes can be employed (e.g., median diameter between about 40 μm and about 70 μm). The microspheres can be suspended in the uncured encapsulant, and remain there during application and after curing. To suitably reduce electrical cross-talk in the bidirectional device, the microspheres can comprise between about 25% and about 75% of the encapsulant composition by volume, corresponding to a reduction of the encapsulant effective dielectric constant between about 25% and about 50% (relative to the encapsulant without the microspheres). A silicone encapsulant 500 with microspheres in that volume-fraction range can exhibit an effective dielectric constant between about 2.5 and about 1.7, respectively, relative to a dielectric constant of about 2.8 without the microspheres. Reductions in electrical cross-talk penalty between about 0.1 dB and about 3 dB have been observed when hollow microspheres are incorporated into the encapsulant 500 (relative to the observed electrical cross-talk penalty of the same device with the same encapsulant but without the microspheres). The amount of electrical cross-talk reduction attributable to the hollow microspheres can vary depending on a variety of factors, e.g., the specific arrangement of optoelectronic components and conductive elements on the substrate; the manner in which electrical signals are coupled to or from the optoelectronic devices, such as unipolar, bipolar, or differential coupling; or other measures in addition the hollow microspheres taken to reduce electrical cross-talk.

In many examples of a protective encapsulant 500, a filler is needed to increase the viscosity of the uncured polymer to facilitate its application to the device. Without sufficient viscosity, during application the uncured polymer tends to flow beyond those areas desired to be encapsulated (as is the case for an uncured encapsulant formulation having viscosity less than about 400-600 cps, for example). A filler is often employed to increase the viscosity of the uncured polymer to a suitable level during application, and that filler remains incorporated within the encapsulant after curing. Solid silica particles are commonly employed as a filler, but tend to exhibit a relatively large dielectric constant (between about 3 and 8, depending on specific composition). Incorporation of such high-dielectric filler particles into the encapsulant 500 would tend to increase its effective dielectric constant, thereby also increasing electrical cross-talk in the encapsulated device (beyond that exhibited if the encapsulant 500 included no filler). However, the hollow microspheres 520 can serve as the filler, increasing the viscosity of the uncured polymer to a desired level for application while also reducing its effective dielectric constant (and electrical cross-talk of the encapsulated device).

Volume fractions for the hollow microspheres between about 25% and about 50% have been observed to yield viscosity of uncured silicone encapsulant mixtures in a range suitable for application to device (e.g., from a few thousand centipoise up to a few tens of thousands of centipoise; more viscous formulations can be employed, but may be unwieldy to apply due to slow flow). That range of volume fraction also appears to enable the microspheres to remain dispersed in lower-viscosity encapsulant formulations; at lower volume fractions in lower-viscosity encapsulant formulations, the microspheres can tend to separate from the encapsulant. However, other volume fractions (higher or lower) can be employed with other uncured encapsulant formulations having differing viscosities (higher or lower), if the resulting mixture can be induced to flow where desired with a desired volume fraction of microspheres. A faster-curing encapsulant can be employed to reduce or avoid flow of a lower-viscosity encapsulant onto unwanted areas.

The reductions in effective dielectric constant or electrical cross-talk disclosed or claimed herein for an encapsulant that includes hollow dielectric microspheres are expressed relative to that same encapsulant without the microspheres or any other filler. Those reductions in cross-talk can be operationally significant and desirable. However, perhaps a more practical comparison would be between the encapsulant with the microspheres and the same encapsulant with solid filler particles, at respective volume fractions that yield similar viscosities (in a range suitable for application to the device). Viewed in this way, the relative reductions in effective dielectric constant and electrical cross-talk that are achieved using the hollow microspheres are even larger than those disclosed herein. Replacement of the solid filler particles with hollow microspheres eliminates the increase in effective dielectric constant arising from the filler particles, in addition to providing the reduction arising from the presence of the microspheres.

A volume fraction of hollow microspheres that is too high can yield an uncured encapsulant mixture that is too viscous to flow properly over the device, limiting the degree to which the effective dielectric constant can be reduced by incorporating the microspheres. An uncured polymer having a viscosity between about 400 cps and about 600 cps (without the microspheres) can have a volume fraction of microspheres up to about 50% and remain sufficiently fluid for application to the device. Higher volume fraction or higher initial viscosity tends to yield an encapsulant mixture that does not flow sufficiently well to encapsulate the device. Uncured encapsulant formulations of lower initial viscosity could be employed to accommodate higher microsphere volume fractions (and therefore lower effective dielectric constant) while still flowing sufficiently for application to the device. A range of combinations of uncured encapsulant viscosity and microsphere volume fraction can be employed to yield a desired combination of flow of the encapsulant mixture and reduction of the encapsulant effective dielectric constant.

In a preferred embodiment, both optical absorber particles 510 and hollow dielectric microspheres 520 are incorporated into the protective encapsulant 500 (FIG. 24). In this way, a single encapsulant 500 can effect reduction of both electrical and optical cross-talk in the bidirectional optoelectronic device. The presence of the microspheres 520 can in some instances enhance the effect of the optical absorber particles 510, by acting as light scatterers. The light scattered from the microspheres 520 propagates a greater distance through the encapsulant 500, increasing the likelihood of an encounter with an absorber particle 510. If combined with hollow microspheres, it can be desirable to avoid high-dielectric or conductive absorber particles (e.g., metal or carbon particles), because those would tend to increase the encapsulant dielectric constant. On the other hand, the hollow dielectric microspheres can be employed to at least partly offset (or completely offset, or more than offset) an increase in encapsulant effective dielectric constant arising from such absorber particles. If conductive absorber particles are employed, it is preferable to ensure full curing of the encapsulant, to reduce or avoid unwanted aggregation or poling of the conductive particles and concomitant increase of the effective dielectric constant of the encapsulant.

An optical encapsulant 600 (also referred to herein as a "first level encapsulant"; FIG. 25) can be employed in addition to the protective encapsulant 500 (which can be referred to as a "second level" encapsulant when used in combination with the optical encapsulant 600). If the bidirectional device includes any free space portions of optical paths followed by optical signals 14, 16 or 18, an optical encapsulant 600 typically is needed, at least to exclude the protective encapsulant from those spaces. For example, if an optical splitter/combiner 110 is employed that comprises a beamsplitter positioned between end faces of the waveguide 102, 104, and 106, then the optical encapsulant can fill the optical path between the waveguides and the beamsplitter. Similarly, any gap between a waveguide end face and a photodetector or a light source can be filled with the optical encapsulant. Use of such an encapsulant 600 can prevent contamination of optical transmission surfaces or blockage of optical paths by the encapsulant 500, or by foreign substances. An optical encapsulant 600 can also be selected to provide index matching with the waveguides, photodetectors, light source, or other elements, to reduce unwanted reflections in the device. Such reflections can act as sources of optical loss for desired optical signals, and also as sources of unwanted optical signals that can result in additional optical cross-talk. The first level encapsulant 600 can also provide protection from environmental degradation of the device, e.g., by corrosion in the presence of moisture. Examples of suitable materials can include, but are not limited to, silicone or epoxy polymers.

When an optical encapsulant 600 is employed, it can be applied to the bidirectional device and cured prior to application and curing of the encapsulant 500. Alternatively, the encapsulant 500 can be applied after application but before curing of optical encapsulant 600, and both encapsulants can be cured together in a common curing process, assuming the encapsulants 500 and 600 can remain in place and substantially unmixed prior to curing.

Combinations

Three techniques are disclosed herein for reducing cross-talk in multi-channel or bidirectional optoelectronic devices: a drive circuit for bipolar driving of the light source, light collectors and light traps on a waveguide substrates, and an encapsulant having a reduced dielectric constant or acting an optical absorber. Each of those techniques can be used alone. However, use in a single optoelectronic device of any two or all three techniques in combination, in any of their disclosed variations, shall also be regarded as falling within the scope of the present disclosure or appended claims. In one example, use of light collectors and light traps combined with use of a optically absorbing encapsulant can reduce optical cross-talk to a greater degree than either of those techniques used alone; in such embodiments the encapsulant can substantially cover the lateral surfaces of the light collectors or light traps, if needed or desired. In another example, use of a bipolar laser drive circuit and an encapsulant with hollow microspheres can reduce electrical cross-talk to a greater degree than either of those techniques used alone. Use of light collectors and traps, a bipolar laser drive circuit, and an encapsulant incorporating both an optical absorber and hollow microspheres can in some examples exhibit still lower levels of electrical or optical cross-talk.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets of one or more features that may not be explicitly disclosed herein. In addition to methods explicitly disclosed or claimed herein: (i) for using any explicitly or implicitly disclosed devices or apparatus; or (ii) for making any explicitly or implicitly disclosed devices or apparatus, the present disclosure shall also be construed as implicitly disclosing generic methods for using or making any explicitly or implicitly disclosed devices or apparatus. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A multi-channel optoelectronic device comprising:
a substrate;
one or more optical waveguides on the substrate;
one or more electrical traces on the substrate;
two or more optoelectronic components on the substrate; and
a protective encapsulant arranged to encapsulate the optoelectronic components, at least portions of the one or more optical waveguides, and at least portions of the one or more electrical traces,
wherein:
each optoelectronic component comprises: (a) a photodetector arranged (i) to receive via at least one of the one or more optical waveguides a corresponding input optical signal modulated to encode corresponding transmitted information and (ii) to generate in response to the corresponding input optical signal and to transmit via at least one of the one or more electrical traces a corresponding output electrical signal modulated to encode the corresponding transmitted information; or (b) a light source arranged (i) to receive via at least one of the one or more electrical traces a corresponding input electrical signal modulated to encode corresponding transmitted information and (ii) to generate in response to the corresponding input electrical signal and to transmit via at least one of the one or more optical waveguides a corresponding output optical signal modulated to encode the corresponding transmitted information;
the encapsulant includes hollow dielectric microspheres dispersed within its volume so as to reduce a cross-talk penalty arising from unwanted electrical signals present in the encapsulant to a level below that exhibited by the multi-channel device without the microspheres in the encapsulant; and
the encapsulant further includes an optical absorber dispersed within its volume so as to reduce a cross-talk penalty arising from unwanted optical signals present in the encapsulant to a level below that exhibited by the optoelectronic device without the optical absorber in the encapsulant.

2. A bidirectional optoelectronic device comprising:
(a) a substrate;
(b) one or more optical waveguides on the substrate;
(c) one or more electrical traces on the substrate;
(d) a first optoelectronic component comprising a photodetector arranged (i) to receive via at least one of the one or more optical waveguides an input optical signal modulated to encode first transmitted information and (ii) to generate in response to the input optical signal and to transmit via at least one of the one or more electrical traces an output electrical signal modulated to encode the first transmitted information;
(e) a second optoelectronic component comprising a light source arranged (i) to receive via at least one of the one or more electrical traces an input electrical signal modulated to encode second transmitted information and (ii) to generate in response to the input electrical signal and to transmit via at least one of the one or more optical waveguides an output optical signal modulated to encode the second transmitted information; and
(f) a protective encapsulant arranged to encapsulate the photodetector, the light source, at least portions of the one or more optical waveguides, and at least portions of the one or more electrical traces, wherein:
- (g) the encapsulant includes hollow dielectric microspheres dispersed within its volume so as to reduce a cross-talk penalty arising from unwanted electrical signals present in the encapsulant to a level below that exhibited by the bidirectional device without the microspheres in the encapsulant; and
- (h) the encapsulant further includes an optical absorber dispersed within its volume so as to reduce a cross-talk penalty arising from unwanted optical signals present in the encapsulant to a level below that exhibited by the optoelectronic device without the optical absorber in the encapsulant.

3. The device of claim 2 wherein the optoelectronic components are positioned on the substrate within about 2 mm of one another.

4. The device of claim 2 wherein edge dimensions of the substrate are less than about 10 mm.

5. The device of claim 2 wherein the photodetector exhibits a cross-talk penalty less than about 3 dB.

6. The device of claim 5 wherein the optoelectronic components are positioned on the substrate within about 2 mm of one another.

7. The device of claim 5 wherein edge dimensions of the substrate are less than about 10 mm.

8. The device of claim 2 wherein the dielectric microspheres are present in an amount so that a dielectric constant of the encapsulant is between about 1.7 and about 2.5.

9. The device of claim 2 wherein the dielectric microspheres are present in an amount so that an average dielectric constant of the encapsulant with the microspheres is between about 25% and about 50% less than a dielectric constant of the encapsulant without the microspheres.

10. The device of claim 2 wherein the encapsulant comprises between about 25% and about 50% by volume of the dielectric microspheres.

11. The device of claim 2 wherein the dielectric microspheres have a median diameter between about 40 μm and about 70 μm.

12. The device of claim 2 wherein the hollow dielectric microspheres comprise hollow silica microspheres.

13. The device of claim 2 wherein the encapsulant comprises a silicone, epoxy, or polyurethane polymer.

14. The device of claim 2 further comprising an optical encapsulant arranged to fill one or more segments of a free optical path within the optoelectronic device and to encapsulate a portion of the optoelectronic device beneath the protective encapsulant.

15. The device of claim 2 wherein the optical absorber is present in an amount so that an extinction coefficient κ of the encapsulant is between about $1\ cm^{-1}$ and about $200\ cm^{-1}$ over an operational wavelength range of the optoelectronic device.

16. The device of claim 2 wherein the optical absorber comprises carbon particles dispersed in the encapsulant.

17. The device of claim 16 wherein the encapsulant comprises between about 0.1% and about 2% by weight of carbon particles.

18. A bidirectional optoelectronic device comprising:
- (a) a substrate;
- (b) one or more optical waveguides on the substrate;
- (c) one or more electrical traces on the substrate;
- (d) a first optoelectronic component comprising a photodetector arranged (i) to receive via at least one of the one or more optical waveguides an input optical signal modulated to encode first transmitted information and (ii) to generate in response to the input optical signal and to transmit via at least one of the one or more electrical traces an output electrical signal modulated to encode the first transmitted information;
- (e) a second optoelectronic component comprising a light source arranged (i) to receive via at least one of the one or more electrical traces an input electrical signal modulated to encode second transmitted information and (ii) to generate in response to the input electrical signal and to transmit via at least one of the one or more optical waveguides an output optical signal modulated to encode the second transmitted information; and
- (f) a protective encapsulant arranged to encapsulate the photodetector, the light source, at least portions of the one or more optical waveguides, and at least portions of the one or more electrical traces, wherein:
- (g) the encapsulant comprises a silicone, epoxy, or polyurethane polymer and includes hollow silica microspheres and carbon particles dispersed within its volume;
- (h) the encapsulant comprises between about 25% and about 50% by volume of the silica microspheres and between about 0.1% and about 2% by weight of the carbon particles;
- (i) the dielectric microspheres have a median diameter between about 40 μm and about 70 μm;
- (j) edge dimensions of the substrate are less than about 10 mm; and
- (l) the photodetector exhibits a cross-talk penalty less than about 3 dB.

* * * * *